United States Patent
Kitano et al.

(10) Patent No.: US 9,073,449 B2
(45) Date of Patent: Jul. 7, 2015

(54) EFFICIENCY MAP GENERATING APPARATUS, EFFICIENCY MAP GENERATING METHOD, AND PROGRAM

(75) Inventors: Kazutoshi Kitano, Kamakura (JP); Masahiro Kato, Kanagawa (JP); Yoshikazu Takeuchi, Kanagawa (JP); Kazunobu Hashimoto, Kanagawa (JP); Chihiro Kawabata, Kanagawa (JP); Eiji Muramatsu, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/003,134

(22) PCT Filed: Mar. 10, 2011

(86) PCT No.: PCT/JP2011/055664
§ 371 (c)(1),
(2), (4) Date: Oct. 4, 2013

(87) PCT Pub. No.: WO2012/120682
PCT Pub. Date: Sep. 13, 2012

(65) Prior Publication Data
US 2014/0018988 A1    Jan. 16, 2014

(51) Int. Cl.
*B60W 20/00* (2006.01)
*B60L 15/20* (2006.01)
(Continued)

(52) U.S. Cl.
CPC ............... *B60L 15/2045* (2013.01); *H02P 5/74* (2013.01); *Y02T 10/643* (2013.01); *B60L 15/025* (2013.01); *B60L 2220/42* (2013.01); *B60L 2220/46* (2013.01); *B60L 2240/14* (2013.01); *B60L 2240/421* (2013.01); *B60L 2240/427* (2013.01);
(Continued)

(58) Field of Classification Search
None
See application file for complete search history.

(56) References Cited

U.S. PATENT DOCUMENTS 6,356,817 B1 * 3/2002 Abe ............................. 701/22
8,170,778 B2   5/2012 Ando et al.
(Continued)

FOREIGN PATENT DOCUMENTS

JP    05-168109    7/1993
JP    06-284788    10/1994
(Continued)

OTHER PUBLICATIONS
International Search Report, PCT/JP2011/055664, Apr. 5, 2011.
(Continued)

*Primary Examiner* — John R Olszewski
*Assistant Examiner* — Jess Whittington
(74) *Attorney, Agent, or Firm* — Young & Thompson

(57) ABSTRACT

An efficiency map generating apparatus (100) generates an efficiency map of motors (M) connected to drive wheels of a mobile body and includes an instructed torque detecting unit (111) that detects an instructed torque input for the multiple motors (M), a torque distributing unit (112) that distributes torque to each of the multiple motors (M) based on the instructed torque, a power consumption detecting unit (113) that detects power consumption of the motors (M), a rotation count detecting unit (103) that detects the rotation counts of the motors (M), and an efficiency map generating unit (114) that generates a motor efficiency map (115) based on the torque in multiple combinations, the power consumption, and the rotation counts, where the torque distributing unit (112) causes any of the multiple motors (M) to generate regenerative torque.

10 Claims, 33 Drawing Sheets

(51) Int. Cl.
  *B60L 15/02* (2006.01)
  *H02P 23/14* (2006.01)
  *H02P 5/74* (2006.01)

(52) U.S. Cl.
  CPC ...... *B60L 2240/429* (2013.01); *B60L 2240/463* (2013.01); *B60L 2260/28* (2013.01); *Y02T 10/648* (2013.01); *H02P 23/14* (2013.01); *Y02T 10/7283* (2013.01)

(56) References Cited

U.S. PATENT DOCUMENTS

| | | | |
|---|---|---|---|
| 2009/0119064 A1* | 5/2009 | Brundridge | 702/182 |
| 2010/0076657 A1* | 3/2010 | Jinno et al. | 701/70 |
| 2010/0094526 A1 | 4/2010 | Ando et al. | |
| 2011/0172865 A1* | 7/2011 | Liang et al. | 701/22 |
| 2011/0301793 A1* | 12/2011 | Hsieh et al. | 701/22 |
| 2012/0325573 A1* | 12/2012 | Miller | 180/282 |

FOREIGN PATENT DOCUMENTS

| | | | | |
|---|---|---|---|---|
| JP | 07-039018 | * | 2/1995 | ............ B60L 15/20 |
| JP | 07-39018 | | 2/1995 | |
| JP | 07-46721 | | 2/1995 | |
| JP | 2000-092613 | | 3/2000 | |
| JP | 2000-333304 | | 11/2000 | |
| JP | 2001-231102 | | 8/2001 | |
| JP | 2006-256609 | | 9/2006 | |
| JP | 2006-345677 | | 12/2006 | |
| JP | 2008-128074 | | 6/2008 | |
| JP | 2010-143491 | | 7/2010 | |
| JP | 2010-213429 | | 9/2010 | |
| JP | 2011-001822 | | 1/2011 | |

OTHER PUBLICATIONS

JP Office Action dated Feb. 28, 2012; Application No. 2011-554338.
JP Office Action dated Jul. 19, 2012; Application No. 2011-554338.

* cited by examiner

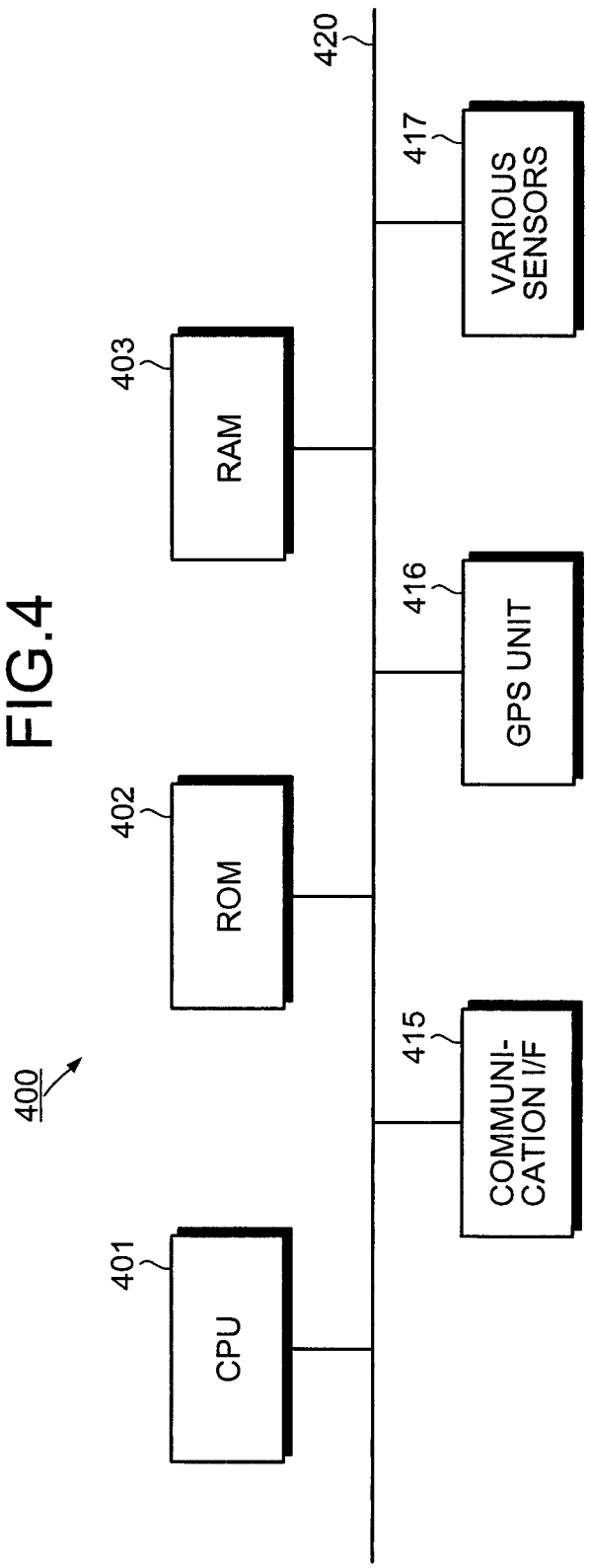

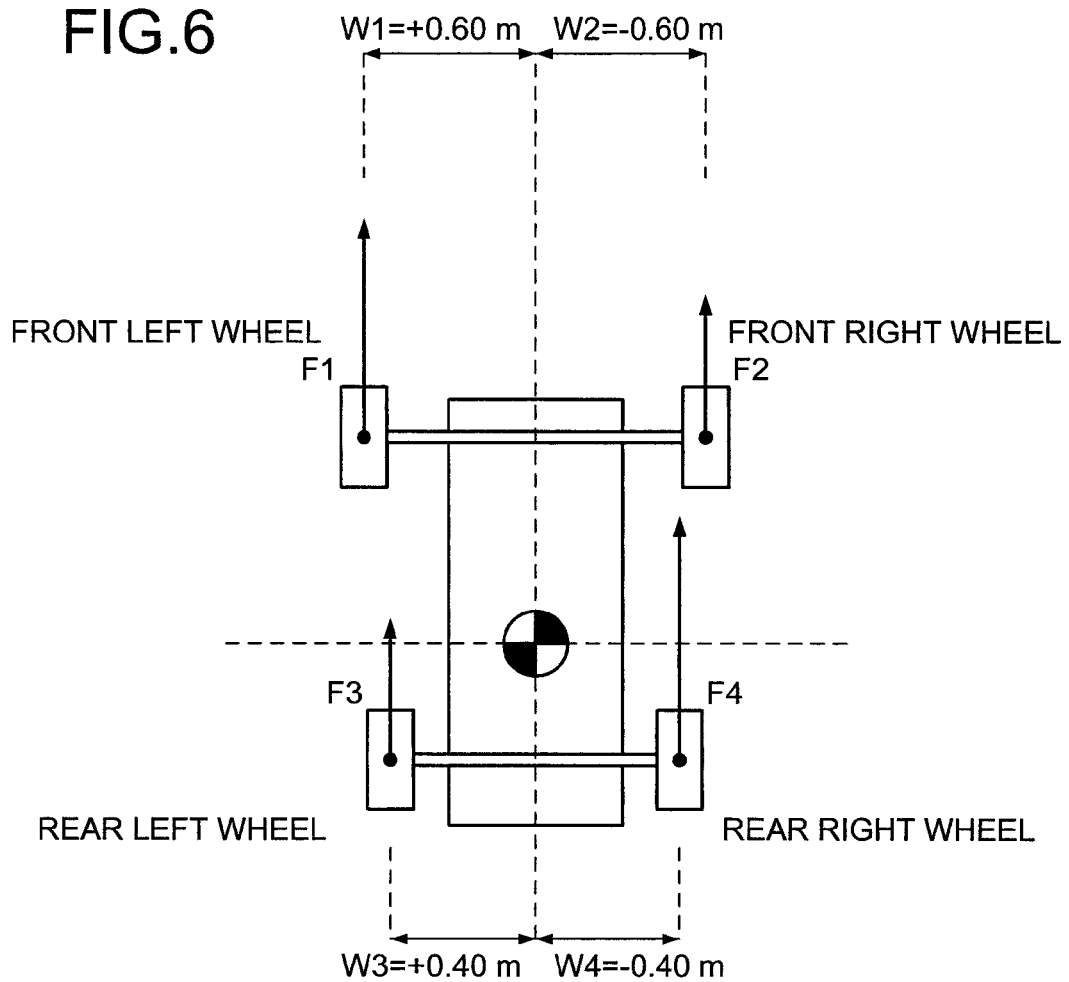

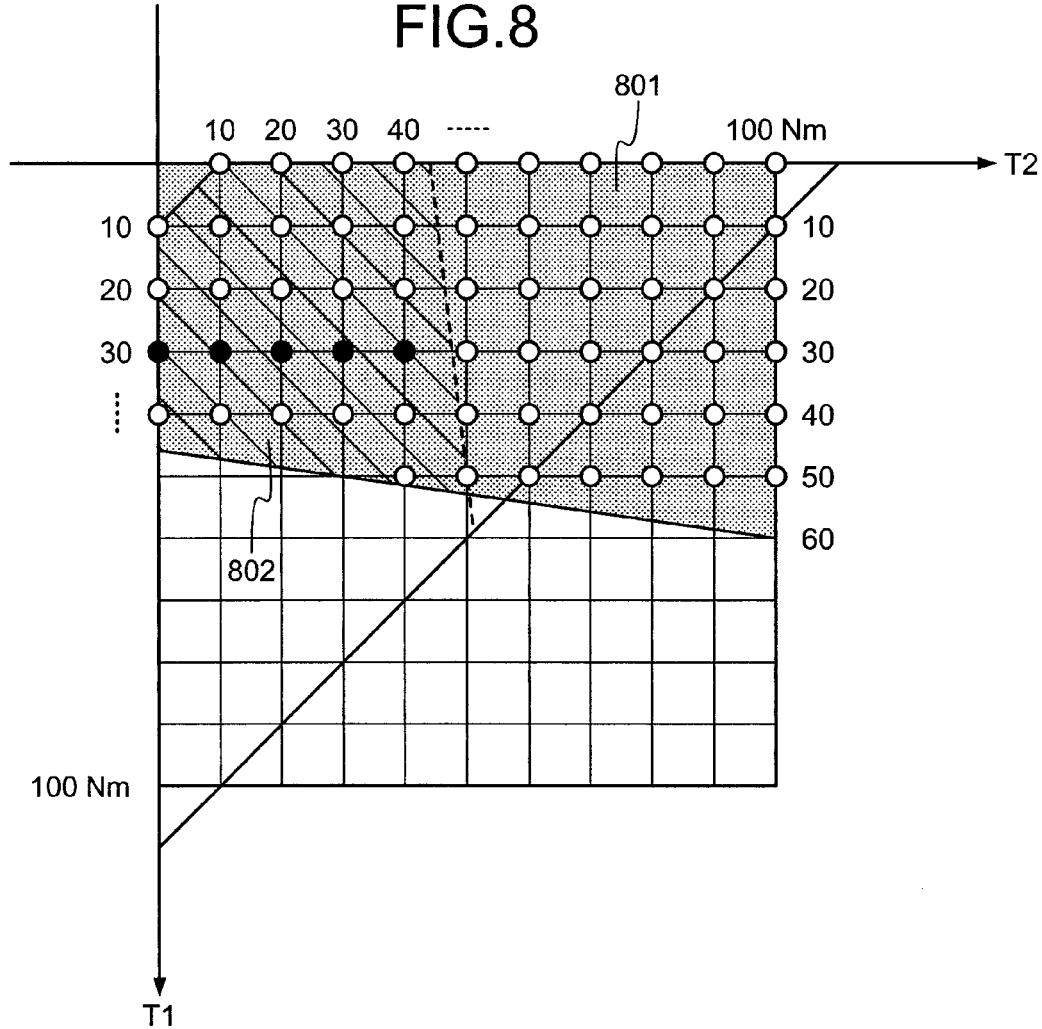

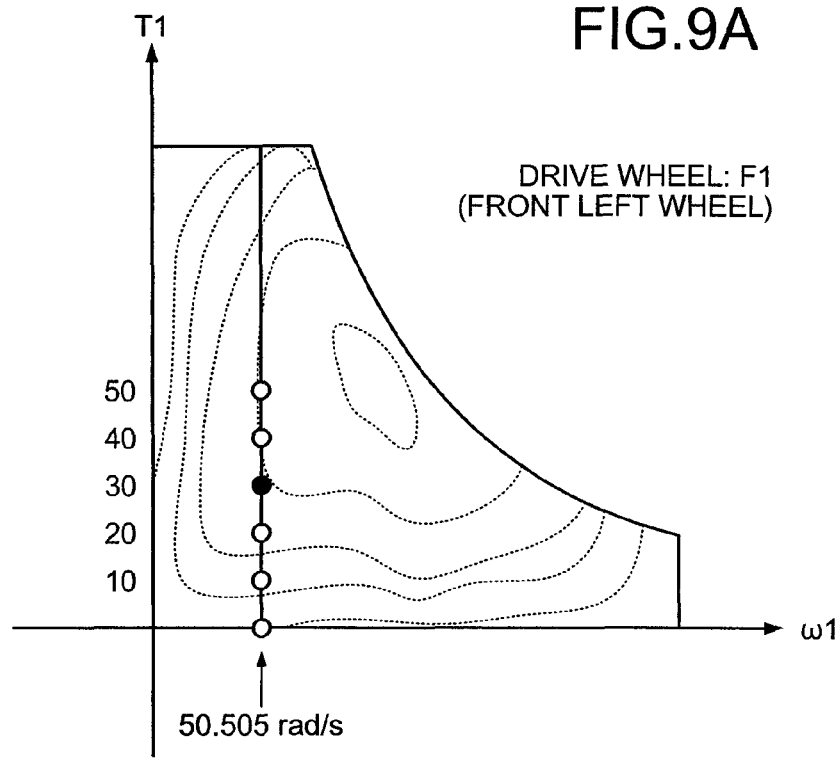
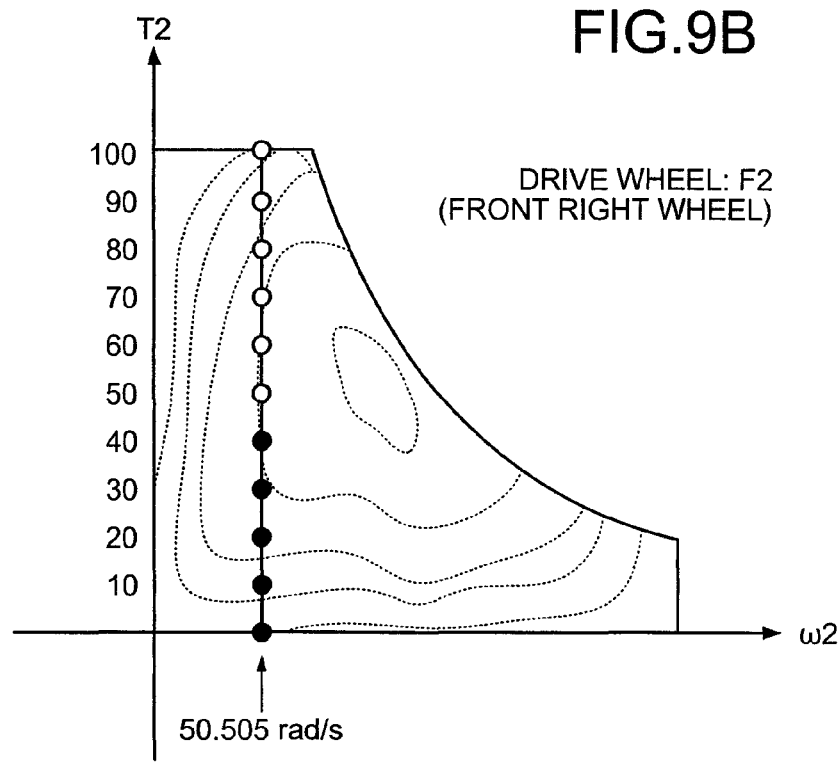

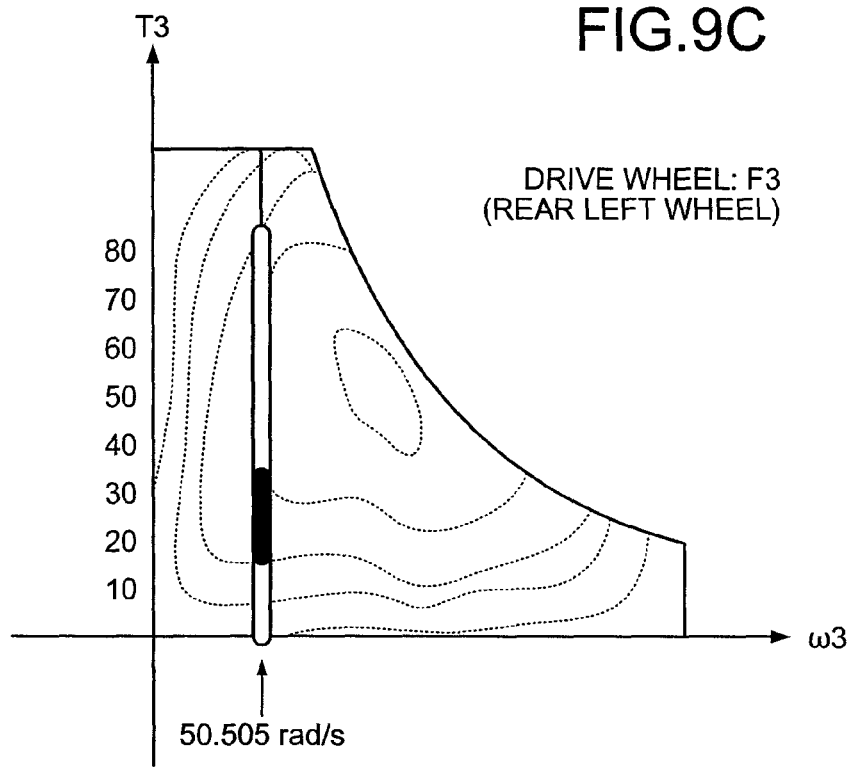
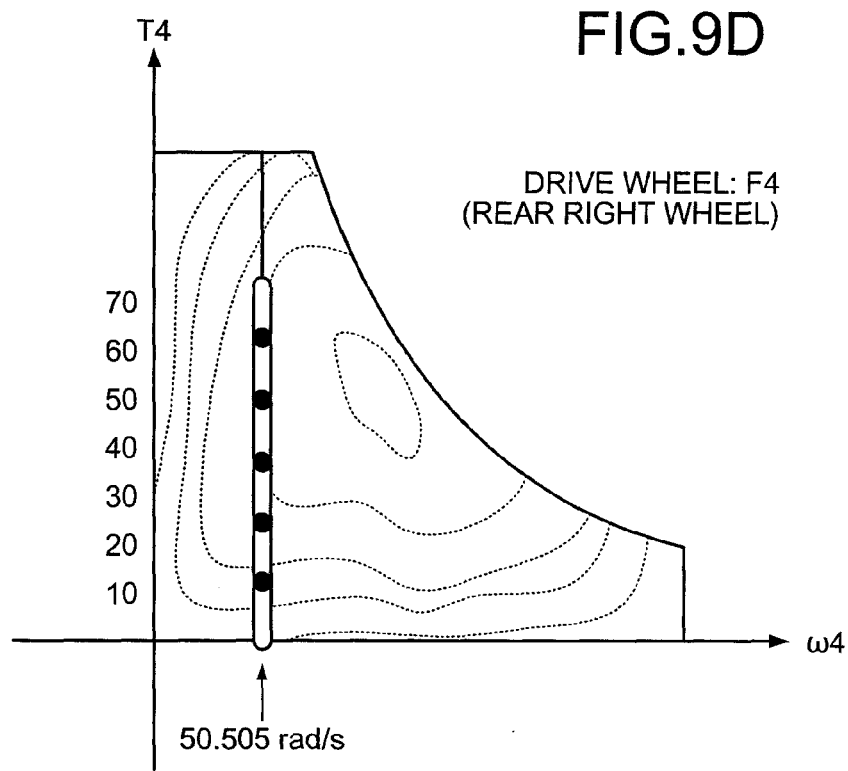

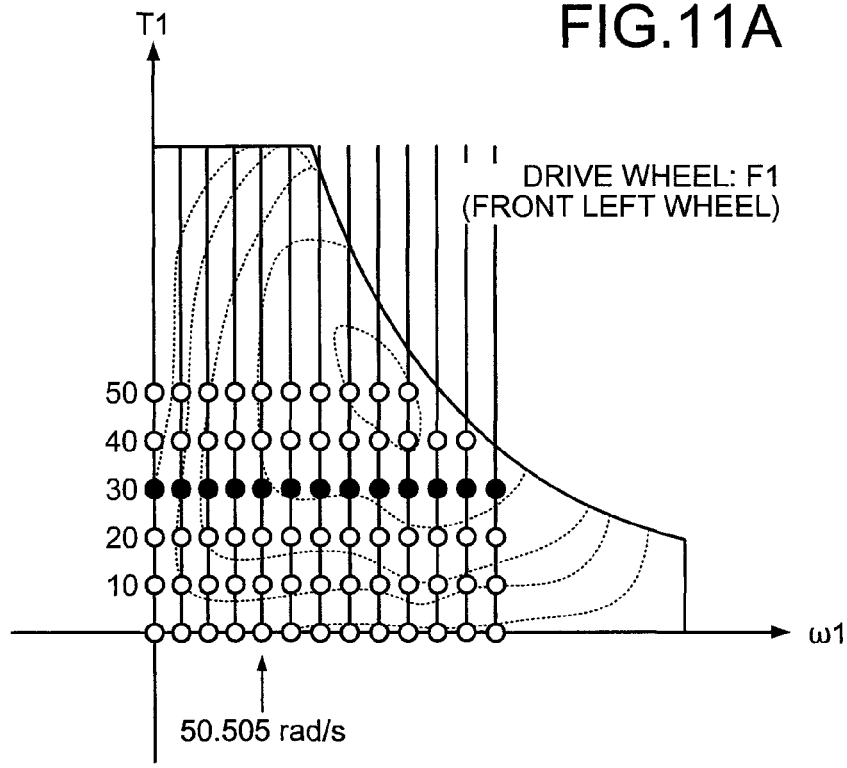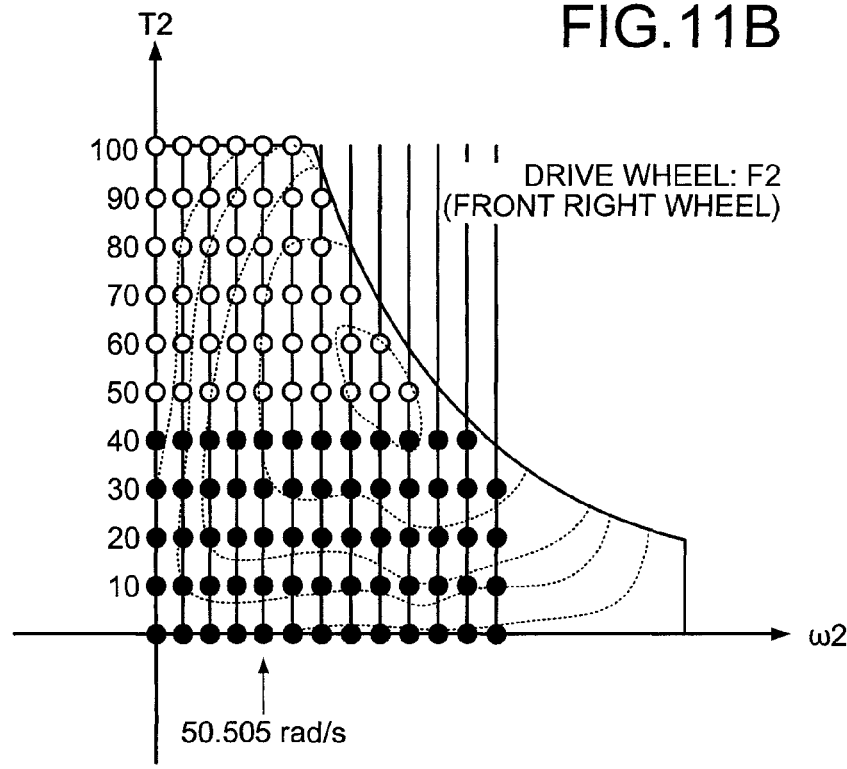

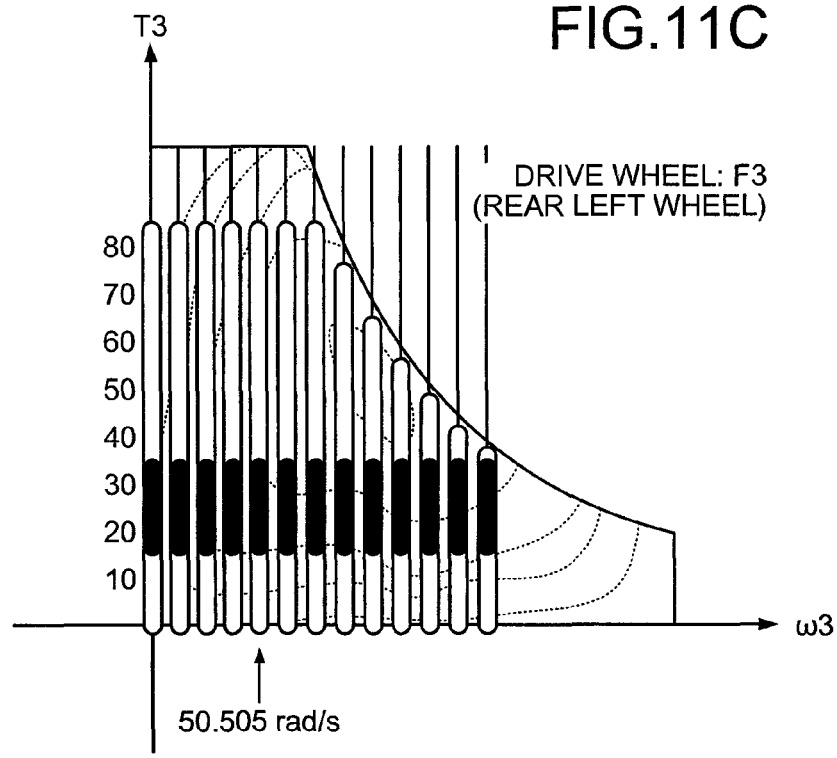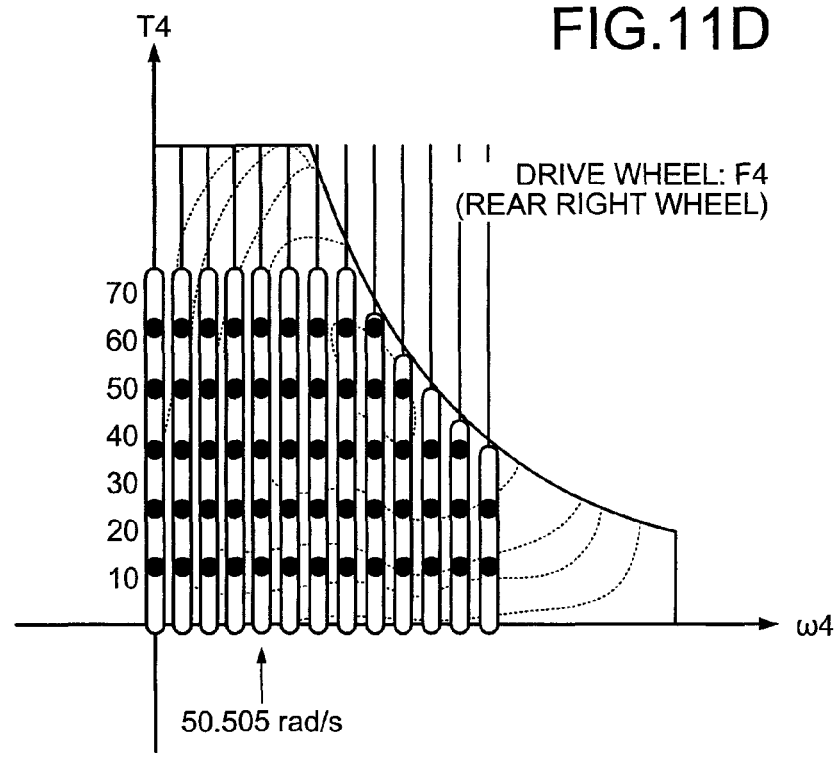

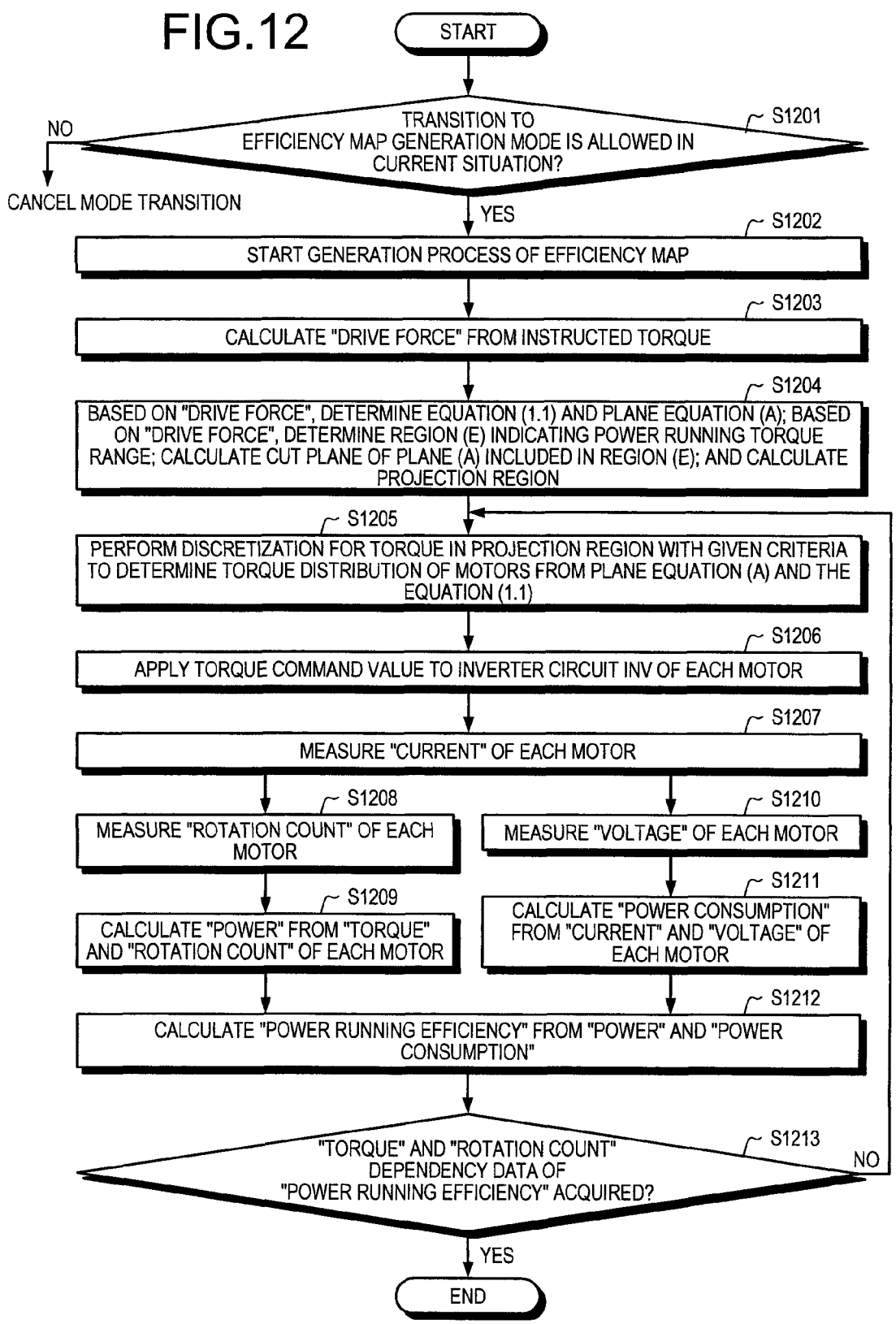

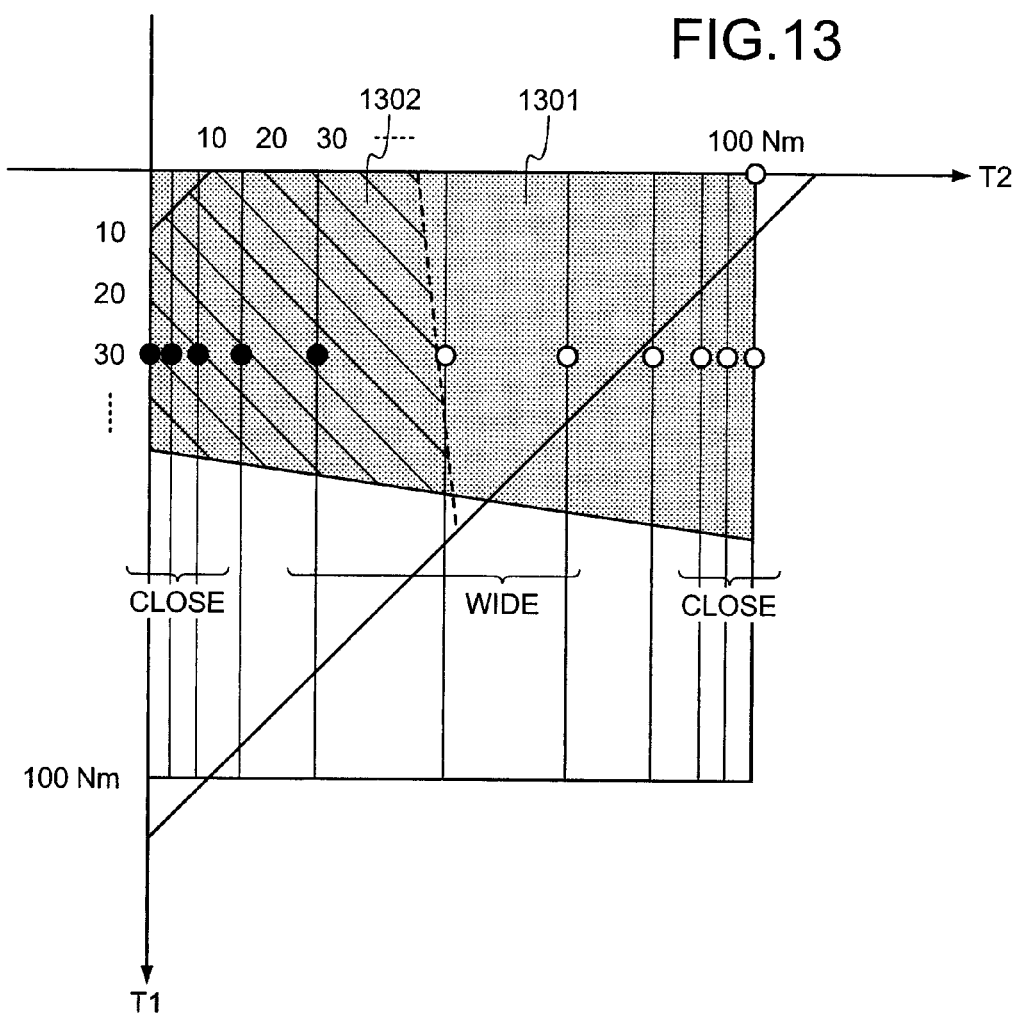

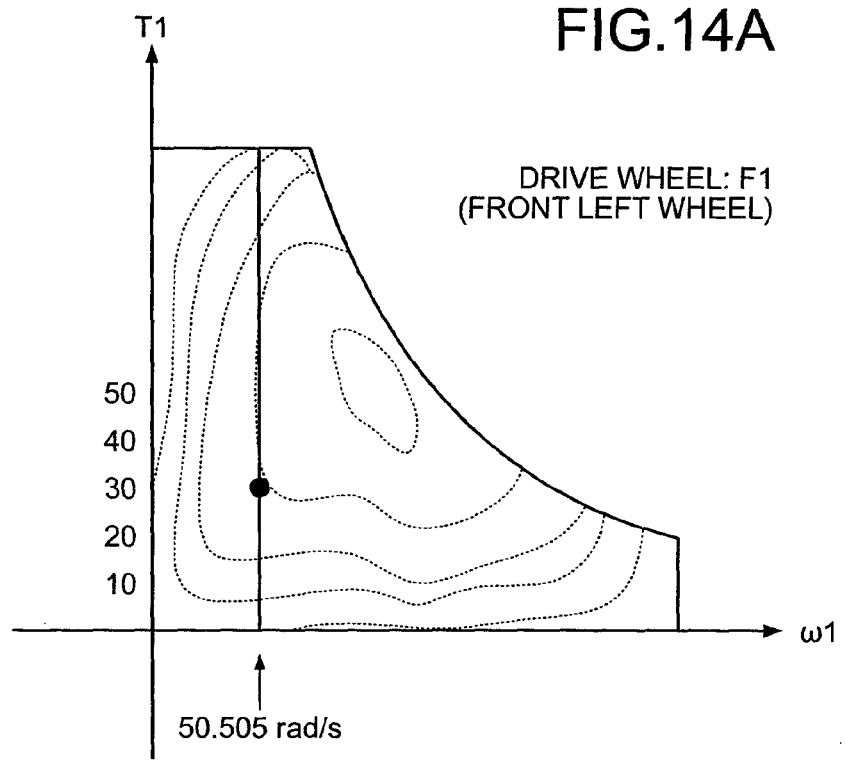
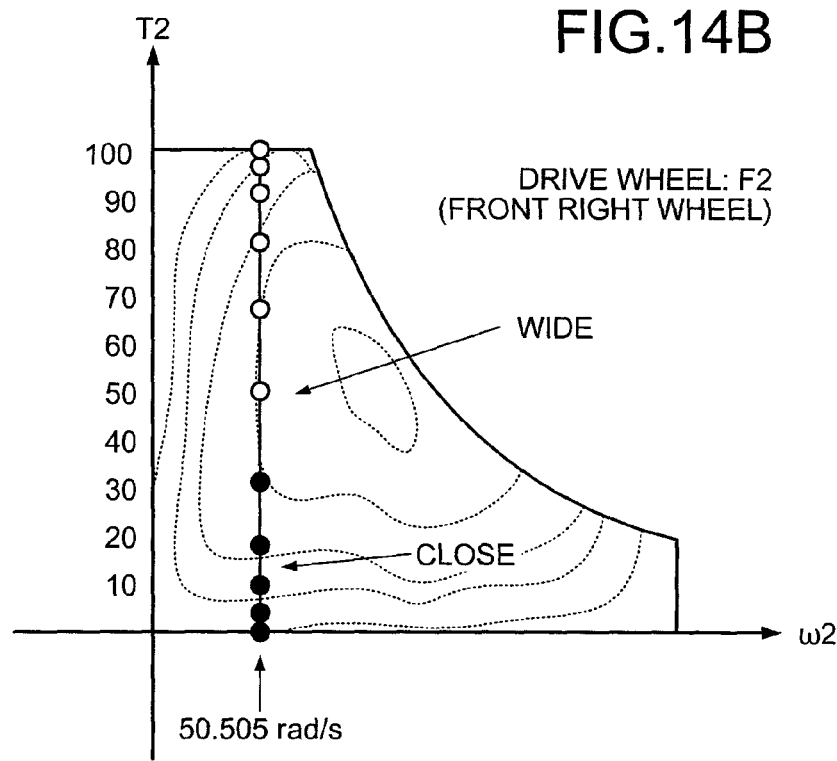

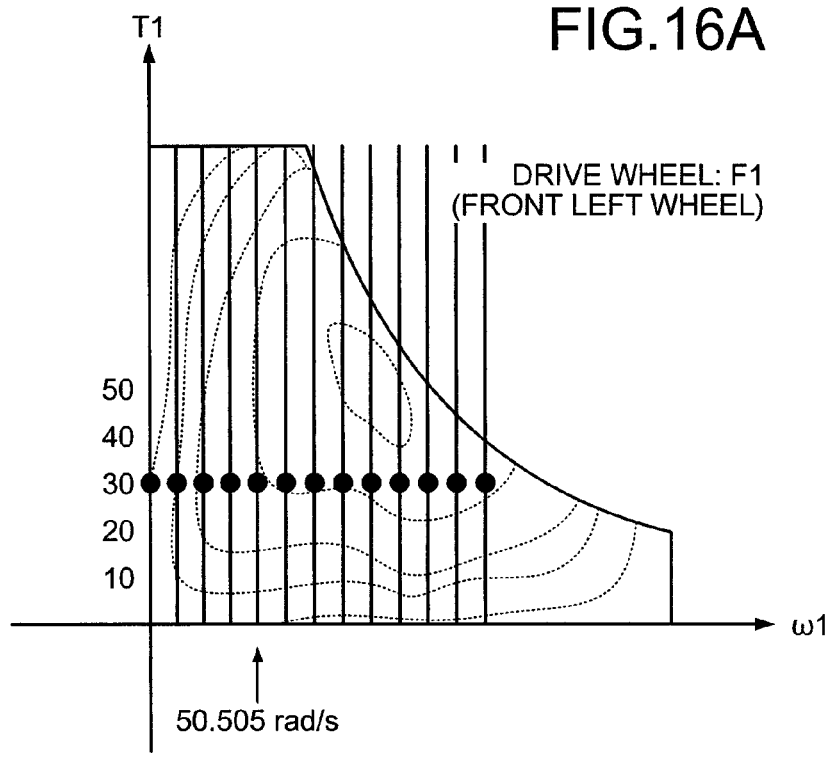
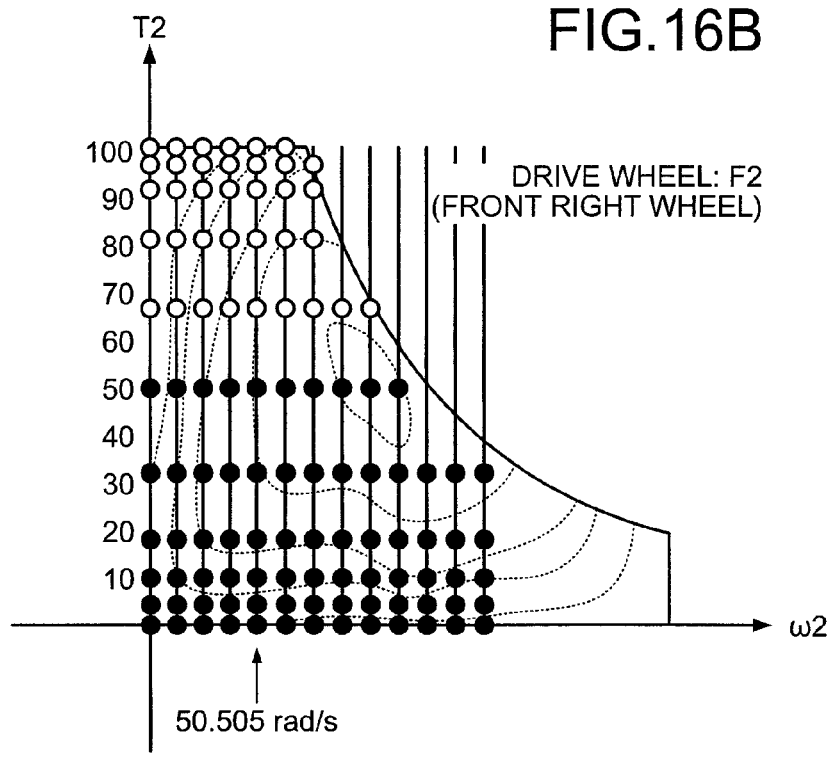

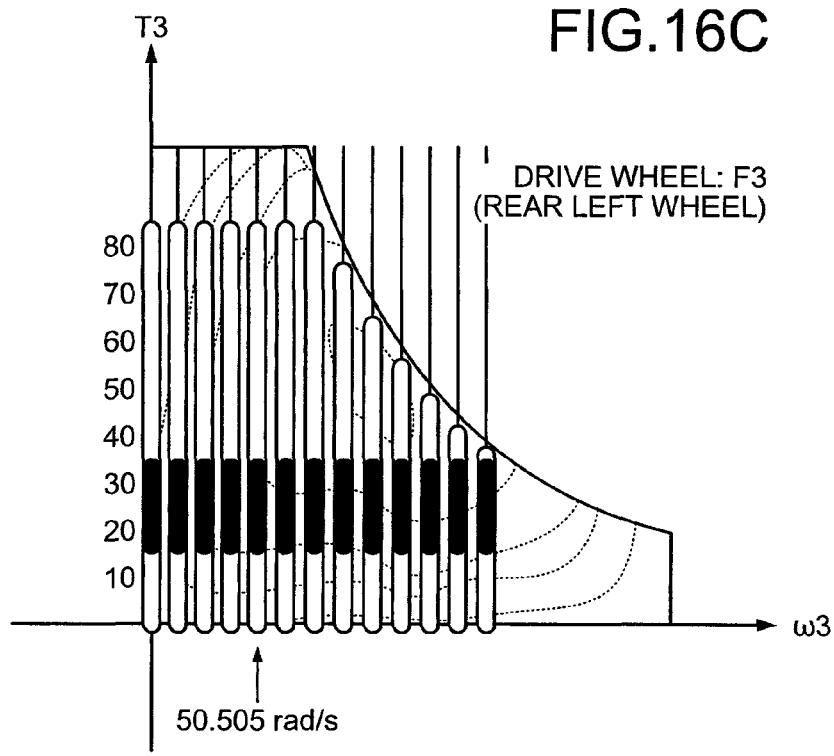
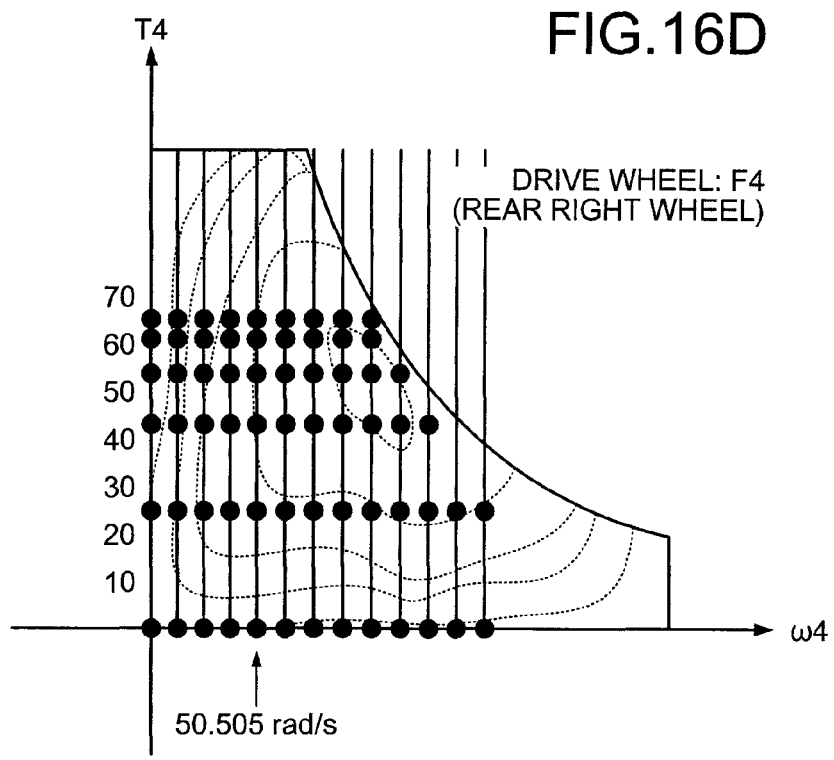

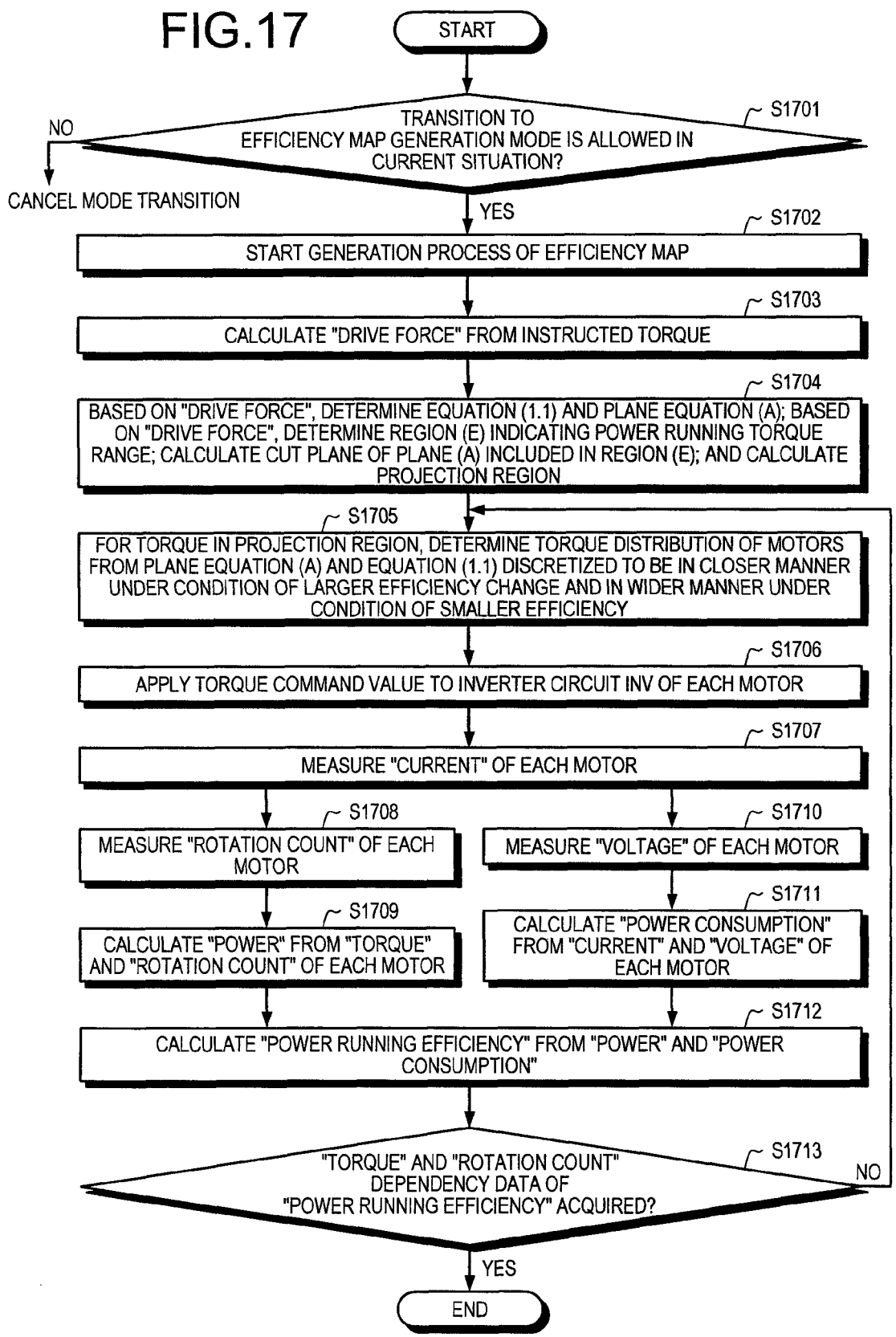

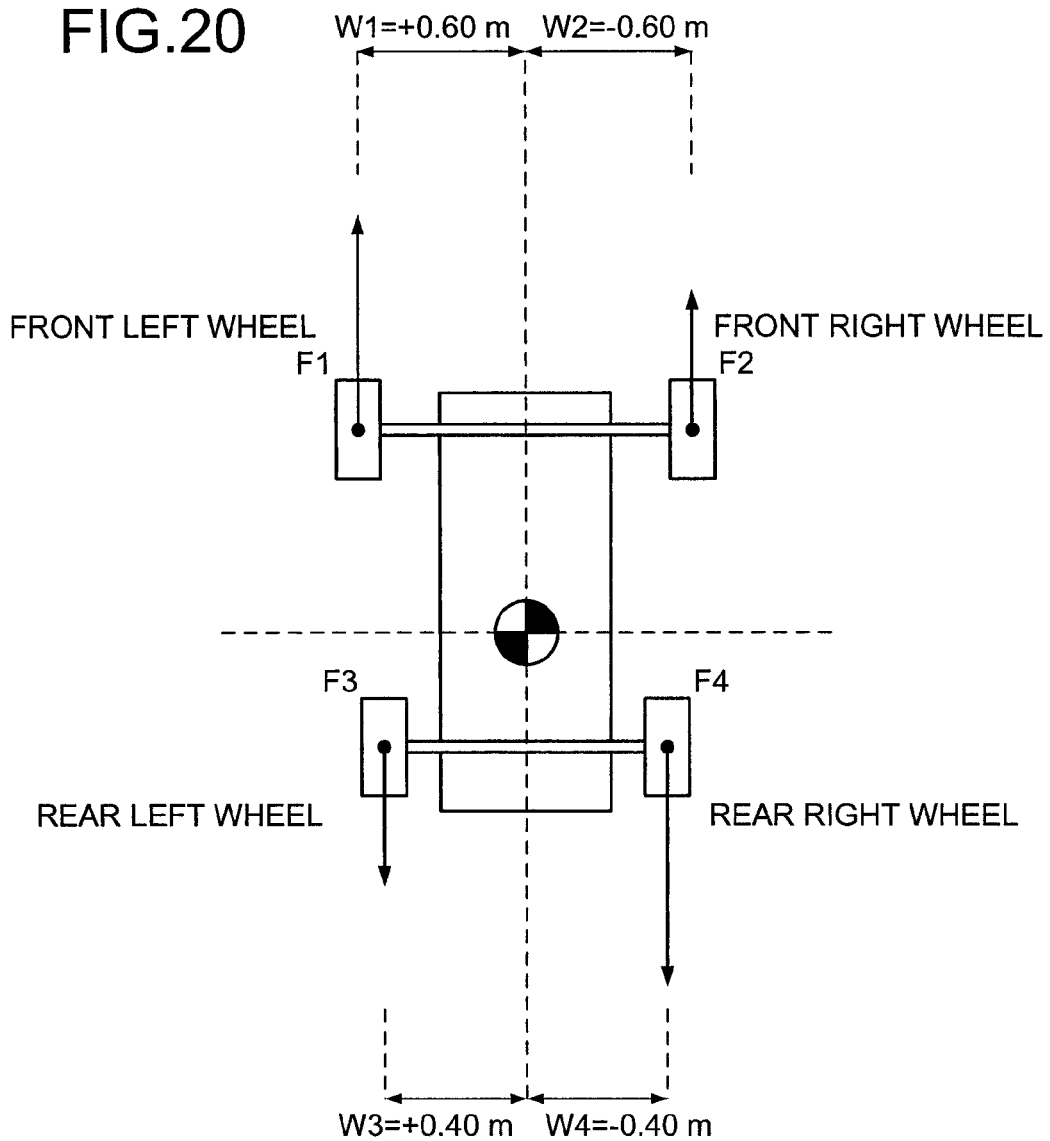

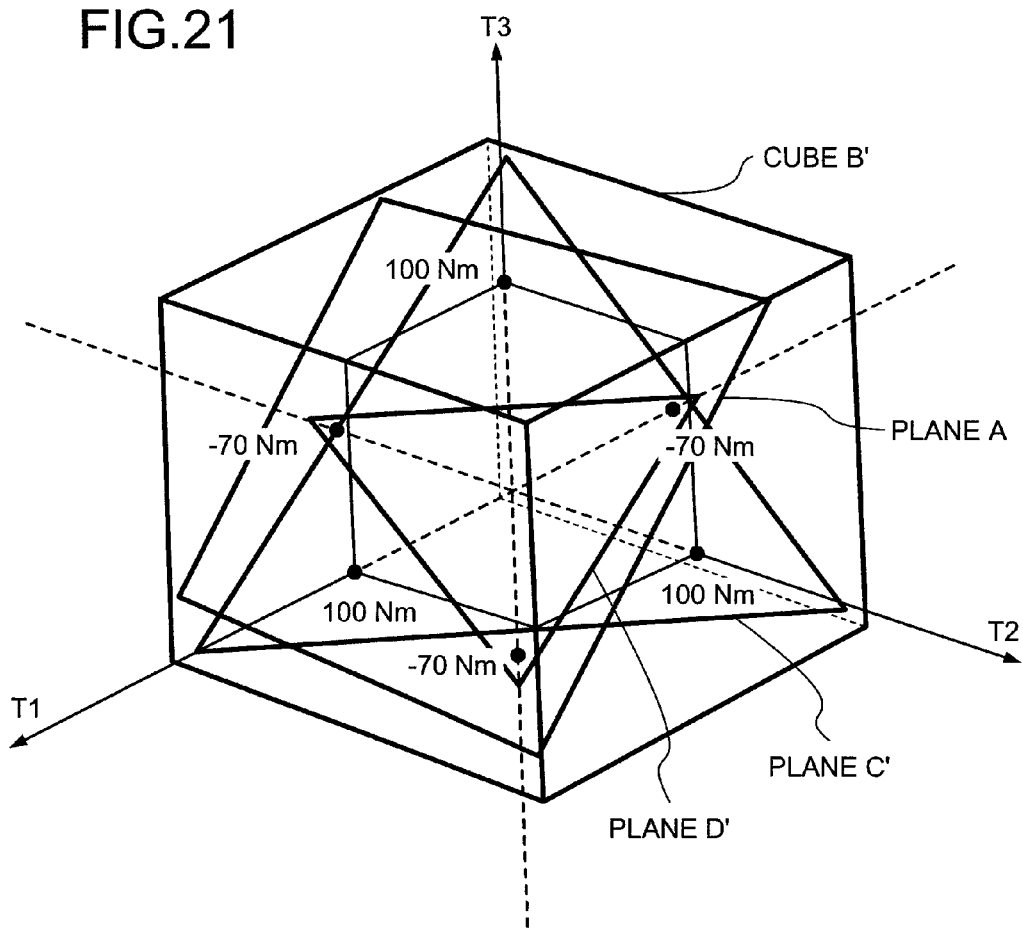

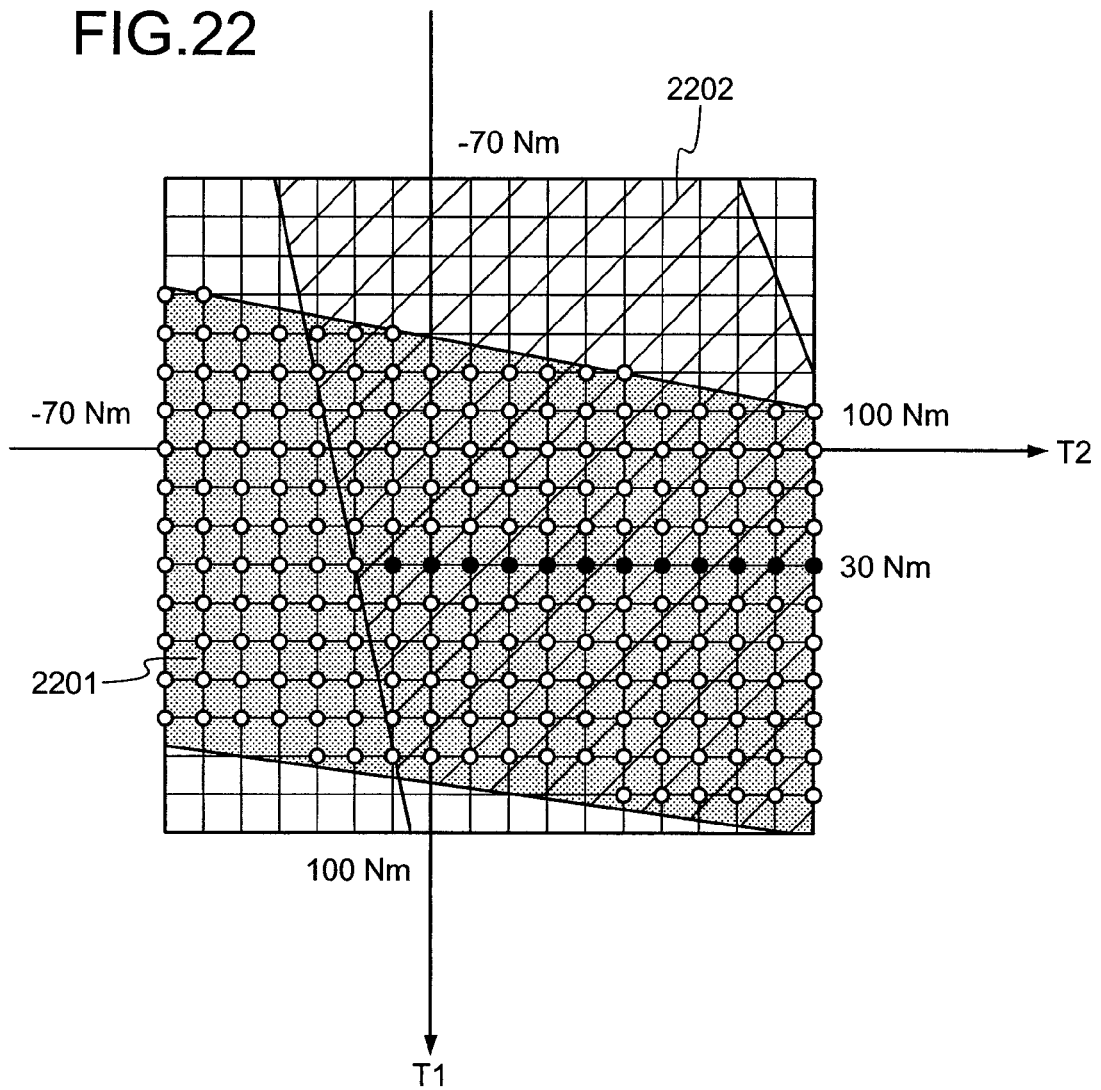

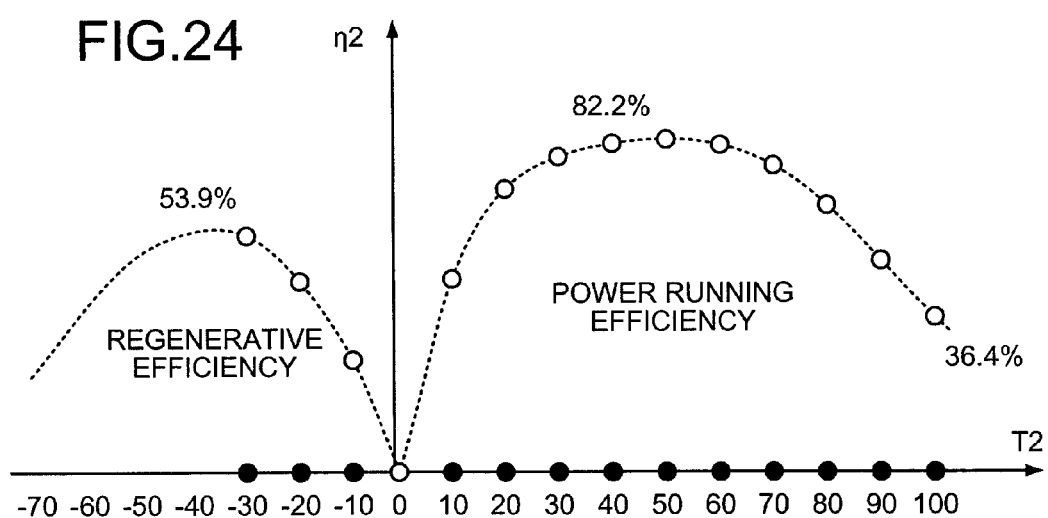

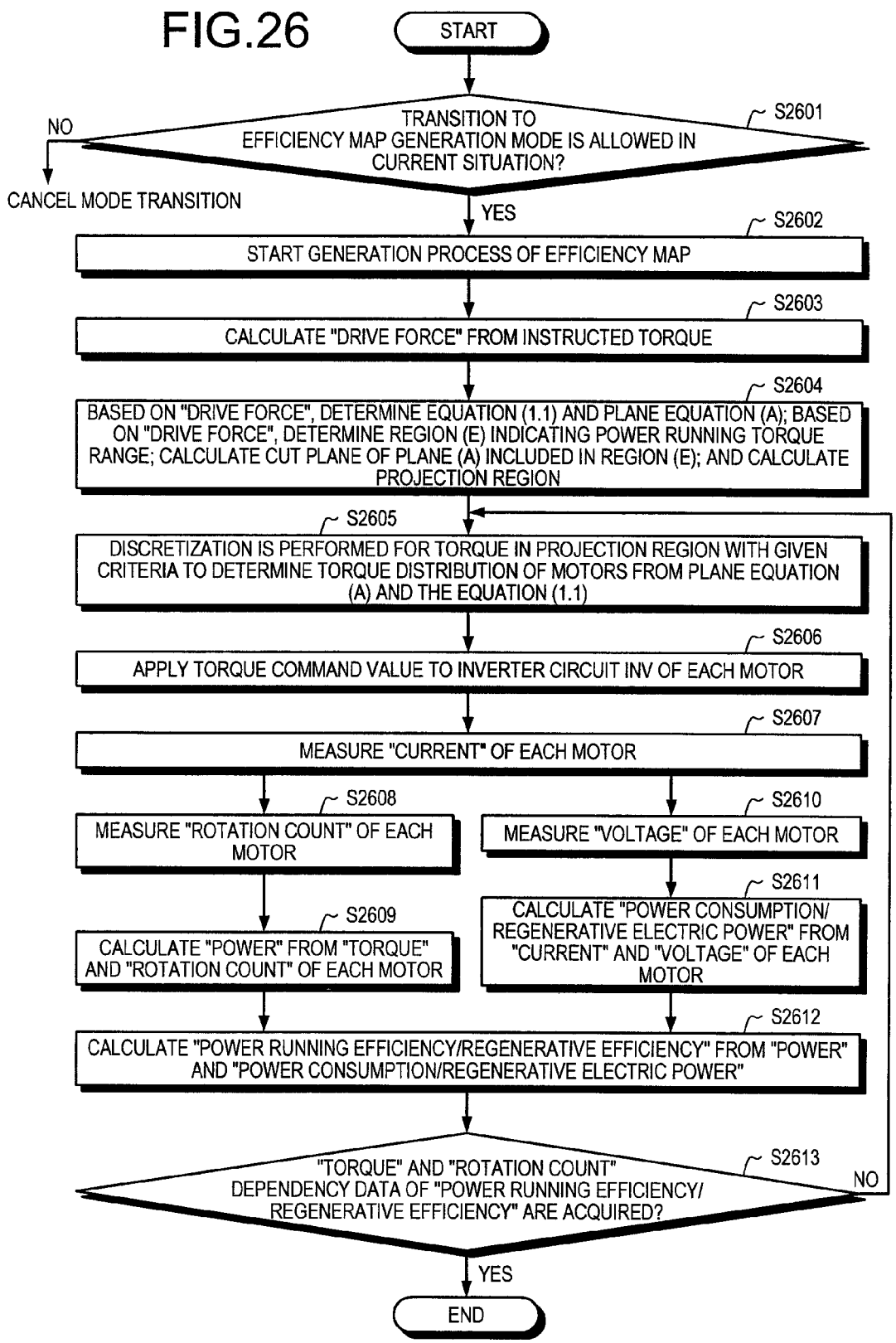

EFFICIENCY MAP GENERATING APPARATUS, EFFICIENCY MAP GENERATING METHOD, AND PROGRAM

TECHNICAL FIELD

The present invention relates to an efficiency map generating apparatus, an efficiency map generating method, and a program generating an efficiency map of motors disposed on a mobile body. However, utilization of the present invention is not limited to the efficiency map generating apparatus, the efficiency map generating method, and the program described above.

BACKGROUND ART

The following techniques have been disclosed as techniques of efficiently controlling a motor by using an efficiency map in a configuration of driving drive wheels (wheels) with the motor disposed on an electric vehicle (EV) that is a mobile body.

In a first technique, an efficiency map is selected according to the state of charge (SOC) of a battery and a gear stage is selected based on the selected efficiency map such that efficiency is optimized. Even if output characteristics of a motor vary in association with a change in the SOC and the actual efficiency map changes, the gear stage can be selected according to the resulting efficiency map or an efficiency map close to this map and total efficiency of a drive device of an electric vehicle can always be optimized (see Patent Document 1).

In a second technique, motor efficiency during power running of a motor is set based on motor rotation speed Nmot and motor torque Tmot as an efficiency map in advance from experiment, and single motor efficiency Emot is obtained from the efficiency map depending on the motor rotation speed Nmot and the motor torque Tmot. Motor efficiency during regenerative control of the running motor is also set in advance from experiment in the same way and the single motor efficiency Emot is obtained from this efficiency map during regenerative control (see Patent Document 2).

In a third technique, multiple rotary electric machine efficiency η maps related to an effective magnetic flux are included, and efficiency values (output power/input power of a rotary electric machine) at a required rotation count and required torque are acquired from the multiple rotary electric machine efficiency η maps to select an effective magnetic flux indicating a value of the highest efficiency among the multiple efficiency values acquired from the multiple rotary electric machine efficiency n maps (see Patent Document 3).

Patent Document 1: Japanese Laid-Open Patent Publication No. H5-168109
Patent Document 1: Japanese Laid-Open Patent Publication No. 2001-231102
Patent Document 1: Japanese Laid-Open Patent Publication No. 2010-213429

DISCLOSURE OF INVENTION

Problem to be Solved by the Invention

However, the techniques described in Patent Documents 1 to 3 include no specific disclosure in terms of the generation of an efficiency map of a motor. All the techniques are configured to operate using an efficiency map prepared in advance and the efficiency map cannot be generated or updated during actual running.

All Patent Documents 1 to 3 describe a configuration of driving a mobile body with a single motor, do not include the idea of changing torque distribution to multiple motors and operating respective efficiency maps for the motors, and are not applicable to a mobile body disposed with a motor for each drive wheel to provide independent motor control.

When multiple running patterns are acquired from experiment etc., to create an efficiency map in a conventional case, a lower running frequency in a high torque region prevents acquisition of sufficient experimental data and makes the generation of the efficiency map of the high torque region difficult.

Means for Solving Problem

To solve the problems above and achieve an object, an efficiency map generating apparatus according to the present invention is an efficiency map generating apparatus that generates an efficiency map of multiple motors connected to drive wheels of a mobile body, and includes an instructed torque detecting unit that detects an instructed torque input for the motors; a torque distributing unit that distributes torque to each of the motors based on the instructed torque; a power consumption detecting unit that detects power consumption of the motors; a rotation count detecting unit that detects rotation counts of the motors; and an efficiency map generating unit that generates the efficiency map based on a plurality of combinations of torque, the power consumption, and the rotation counts, where the torque distributing unit causes any of the motors to generate regenerative torque.

Further, an efficiency map generating method according to the present invention is an efficiency map generating method of an efficiency map generating apparatus that generates an efficiency map of a plurality of motors connected to drive wheels of a mobile body, and includes an instructed torque detecting step of detecting an instructed torque input for the motors; a torque distributing step of distributing torque to each of the motors based on the instructed torque; a power consumption detecting step of detecting power consumption of the motors; a rotation count detecting step of detecting rotation counts of the motors; and an efficiency map generating step of generating the efficiency map based on a plurality of combinations of torque, the power consumption, and the rotation counts, where the torque distributing step causes any of the motors to generate regenerative torque.

A program according to the present invention causes a computer to execute the method above.

BRIEF DESCRIPTION OF DRAWINGS

FIG. 4 is a block diagram of a hardware configuration of the efficiency map generating apparatus;
FIG. 6 is an explanatory view of a four-wheel-drive mobile body model;

FIG. 8 is a diagram of discretization points on a torque T1-T2 plane;

FIG. 9A is a diagram of the motor efficiency map generation of drive wheels (part 1);

FIG. 9B is a diagram of the motor efficiency map generation of the drive wheels (part 2);

FIG. 9C is a diagram of the motor efficiency map generation of the drive wheels (part 3);

FIG. 9D is a diagram of the motor efficiency map generation of the drive wheels (part 4);

FIG. 11A is a diagram of the motor efficiency map generation of the drive wheels (part 1);

FIG. 11B is a diagram of the motor efficiency map generation of the drive wheels (part 2);

FIG. 11C is a diagram of the motor efficiency map generation of the drive wheels (part 3);

FIG. 11D is a diagram of the motor efficiency map generation of the drive wheels (part 4);

FIG. 12 is a flowchart of an efficiency map generation process according to a first example;

FIG. 13 is a diagram of discretization points on the torque T1-T2 plane according to a second example;

FIG. 14A is a diagram of the motor efficiency map generation of the drive wheels (part 1);

FIG. 14B is a diagram of the motor efficiency map generation of the drive wheels (part 2);

FIG. 16A is a diagram of the motor efficiency map generation of the drive wheels (part 1);

FIG. 16B is a diagram of the motor efficiency map generation of the drive wheels (part 2);

FIG. 16C is a diagram of the motor efficiency map generation of the drive wheels (part 3);

FIG. 16D is a diagram of the motor efficiency map generation of the drive wheels (part 4);

FIG. 17 is a flowchart of an efficiency map generation process according to the second example;

FIG. 20 is an explanatory view of a four-wheel-drive mobile body model;

FIG. 21 is a diagram of a torque range cube B' in the Euclidean space, a region E' sandwiched by planes C' and D', and the cut plane A;

FIG. 22 is a diagram of discretization points on the torque T1-T2 plane;

FIG. 24 is a diagram of torque dependency of motor power running/regenerative efficiency;

FIG. 26 is a flowchart of an efficiency map generation process according to the second embodiment;

BEST MODE(S) FOR CARRYING OUT THE INVENTION

Preferred embodiments of an efficiency map generating apparatus, an efficiency map generating method, and a program according to the present invention will now be described in detail with reference to the accompanying drawings. In the following description, it is assumed that "rotation speed" is "drive wheel rotation speed".

(First Embodiment)
(Configuration of Efficiency Map Generating Apparatus)

Figure 1:
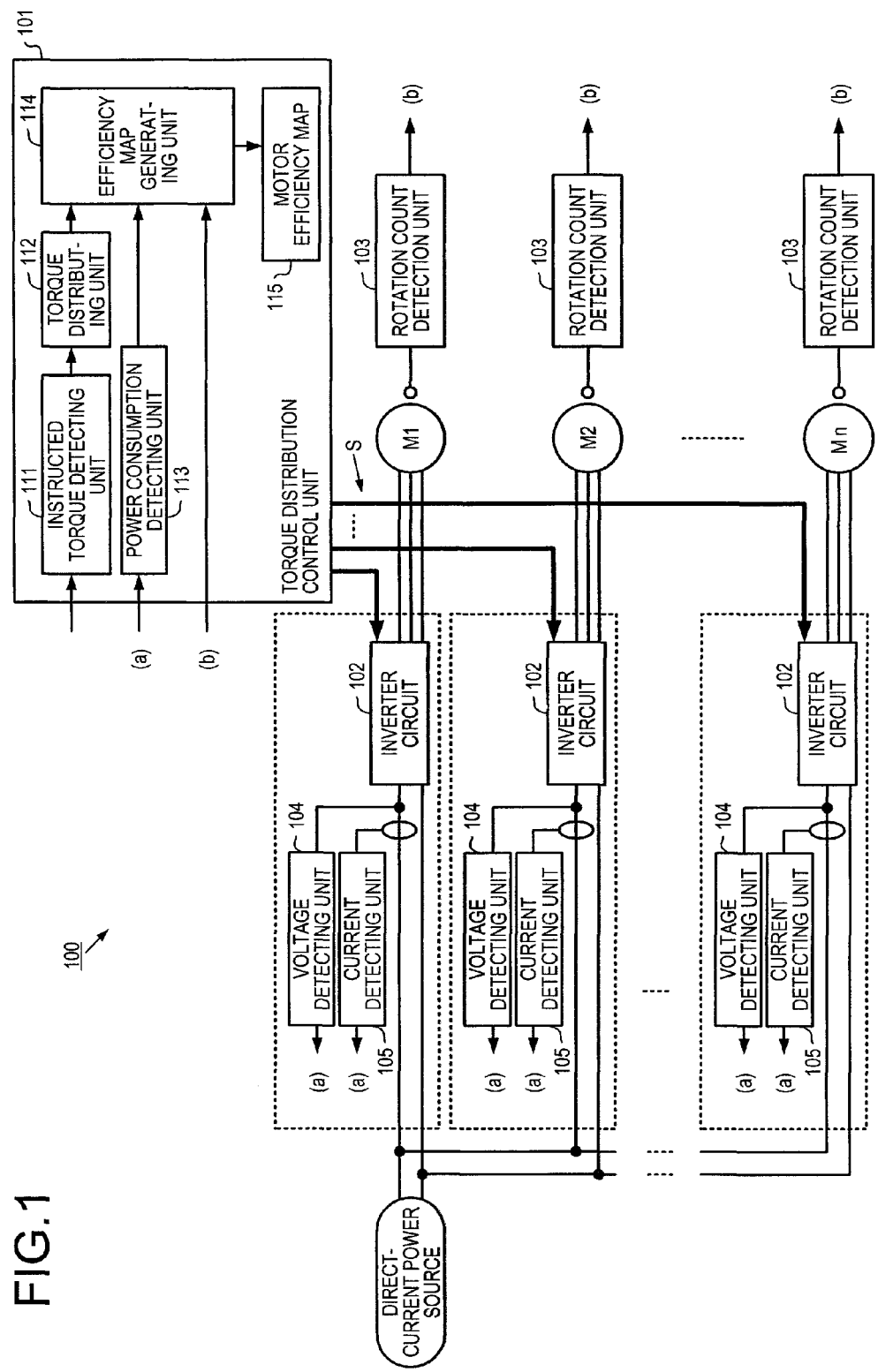
FIG. 1 is a block diagram of a functional configuration of an efficiency map generating apparatus according to a first embodiment.

FIG. 1 is a block diagram of a functional configuration of an efficiency map generating apparatus according to a first embodiment. An efficiency map generating apparatus 100 according to the first embodiment controls torque distribution to multiple drive wheels while causing a mobile body to run and generates (and updates) an efficiency map of motors driving the drive wheels. Information of the efficiency map is characteristics of torque relative to rotation speed of the motors.

A torque distribution control unit 101 controls the torque distribution to n motors M1 to Mn disposed on the mobile body. The torque distribution control unit 101 is disposed as a portion of a configuration of a controller (ECU) generally controlling the driving of the mobile body.

The multiple motors M1 to Mn receive power supply from a direct-current power source and inverter circuits (INV) 102 drive the motors M1 to Mn with torque distributed based on a control signal S of the torque distribution control unit 101.

The rotation counts of the motors M1 to Mn are respectively detected by rotation count detection units 103 and output to the torque distribution control unit 101. On each of power-supply lines of the motors M1 to Mn, a voltage detecting unit 104 and a current detecting unit 105 are disposed upstream from the inverter circuit 102 and detected voltage and current are output to the torque distribution control unit 101.

The torque distribution control unit 101 is made up of an instructed torque detecting unit 111, a torque distributing unit 112, a power consumption detecting unit 113, an efficiency map generating unit 114, and a motor efficiency map 115.

The instructed torque detecting unit 111 acquires an instructed torque for driving the mobile body. Therefore, the instructed torque detecting unit 111 calculates a drive force driving the mobile body based on the instructed torque input through accelerator pedal operation for driving the n motors M (M1, M2, ..., Mn) respectively disposed on the drive wheels. In this embodiment, the description is based on the assumption that motors of the same type are used as the multiple motors M.

The torque distributing unit 112 distributes torque in multiple combinations to each of the n motors M1 to Mn based on the instructed torque detected by the instructed torque detecting unit 111 and drives the motors M1 to Mn at torque distribution values distributed through the inverter circuits 102 with the control signal S.

The efficiency map generating unit 114 generates the motor efficiency map 115 of the motors M1 to Mn based on the torque distribution values in multiple combinations distributed by the torque distributing unit 112, the power consumption of the motors M1 to Mn detected by the power consumption detecting unit 113, and the rotation counts of the motors M1 to Mn detected by the rotation count detection units 103. The motor efficiency map 115 is stored in memory.

(Concerning Efficiency Map Generation process)

Figure 2:
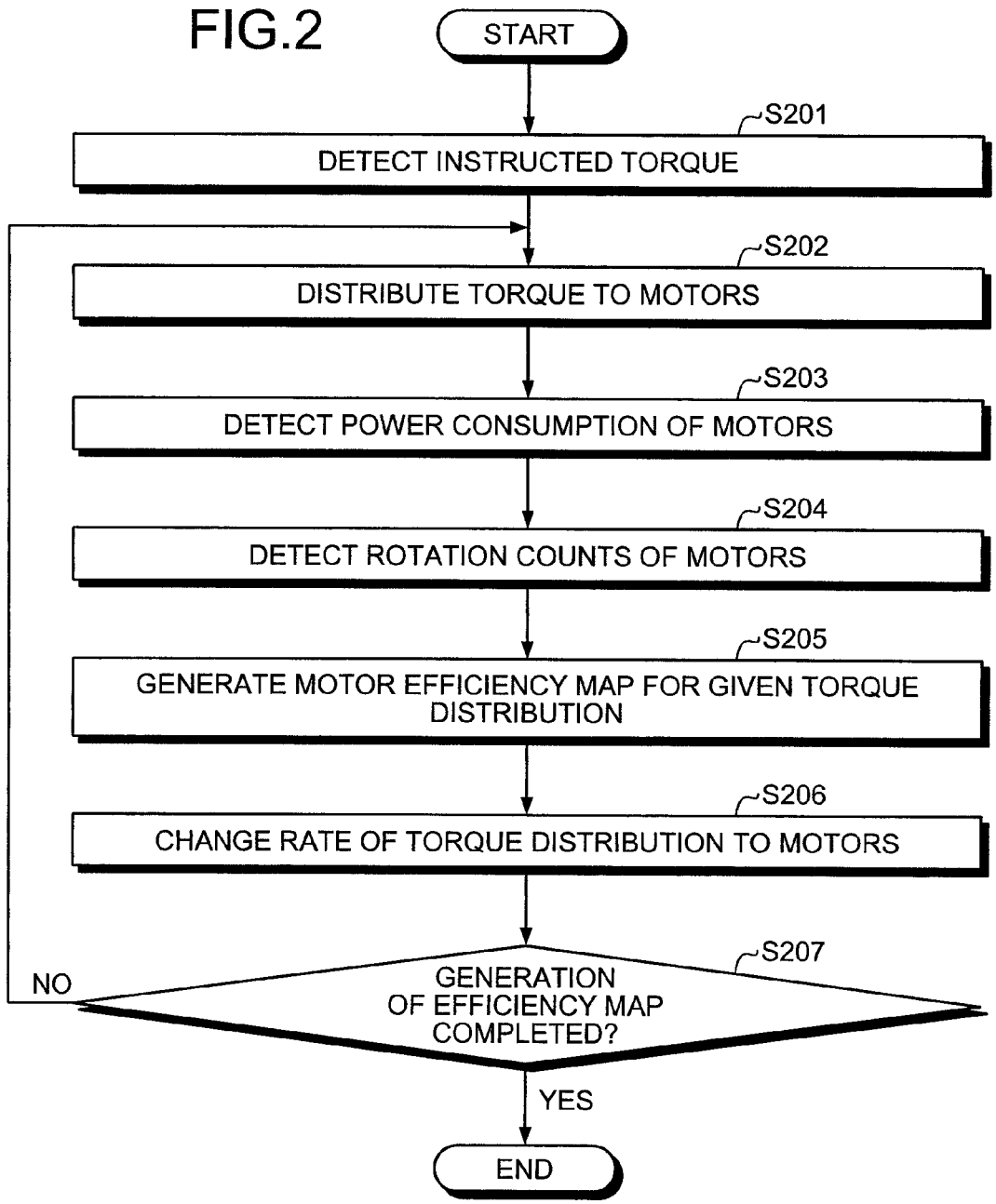
FIG. 2 is a flowchart of a procedure of an efficiency map generation process by the efficiency map generating apparatus.

FIG. 2 is a flowchart of a procedure of an efficiency map generation process by the efficiency map generating apparatus. First, the instructed torque detecting unit 111 detects an instructed torque T input from an accelerator pedal for driving the multiple motors M1 to Mn respectively disposed on the drive wheels (step S201).

When the efficiency map is generated by the process described below, a motor efficiency map generation mode is implemented. The motor efficiency map generation mode is a mode implemented for improving motor efficiency in a mobile body equipped with a motor and can be implemented in an arbitrary period or on a regular basis. For example, the mode can arbitrarily be implemented by a user during a test run after shipment of a mobile body if the user feels that displayed fuel consumption is poor, or can be implemented by notifying a user of an activation request from the efficiency map generating apparatus 100 at regular time interval (e.g., every month). During the motor efficiency map generation mode, the following two conditions are set:

1. the mobile body is caused to run at constant speed; and
2. the moment around the gravity center of the mobile body is set to zero.

The torque distributing unit 112 distributes torque in multiple combinations for each of the n motors M1 to Mn based on the instructed torque detected by the instructed torque detecting unit 111 (step S202). This torque distribution is an initial value and set as a predetermined distribution rate (e.g., torque is equally distributed to all the motors M1 to Mn). In this case, the power consumption of the motors M1 to Mn is detected by the power consumption detecting unit 113 (step S203) and the rotation counts of the motors M1 to Mn are detected by the rotation count detection units 103 (S204).

As a result, the efficiency map generating unit 114 generates the motor efficiency map 115 for the motors M1 to Mn having given torque distribution based on the torque distributed in multiple combinations by the torque distributing unit 112, the power consumption of the motors M1 to Mn detected by the power consumption detecting unit 113, and the rotation counts of the motors M1 to Mn detected by the rotation count detection units 103 (step S205). Strictly speaking, torque dependent characteristics of motor efficiency (information for efficiency map generation) can be acquired.

While the conditions 1 and 2 are satisfied, a rate of torque distribution to the motors M1 to Mn is changed to a different torque distribution by the torque distributing unit 112 (step S206). This change in torque distribution can be made, for example, when the number of the drive wheels (the number of motors) is four, such that the torque distribution is changed according to selection of the drive wheels indicated by the cases of selecting four wheels (one pattern), three wheels (four patterns), two wheels (six patterns), and only one wheel (four patterns) out of the drive wheels. Therefore, for a given constant instructed torque set by the amount an accelerator pedal is depressed, four types of torque value data can be acquired per motor.

Until the efficiency map generation is completed (step S207: NO), the procedure goes back to step S202 and the operations at steps S202 to S206 are continuously executed while satisfying the conditions 1 and 2. This enables the acquisition of the information (plots on a map) for generation of the motor efficiency map 115 when the torque distribution is changed at given constant speed.

Although the process at given constant speed is described as above, this constant speed is changed to a different speed to execute the process for this new constant speed in the same way. By acquiring the entire information including different torque distributions for each speed, the generation of the motor efficiency map 115 is completed (step S207: YES) and the process is terminated.

The efficiency map generating apparatus 100 according to the first embodiment described above generates the motor efficiency map 115 of the multiple motors by actually causing the mobile body to run. As a result, the motor efficiency map 115 can be acquired by actually driving the mobile body equipped with the multiple motors M1 to Mn to run, and the reliability of the motor efficiency map 115 can be improved. Since the motor efficiency map 115 is generated by changing the torque distribution to the motors M1 to Mn, the torque dependent characteristics of motor efficiency can accurately be reflected on the motor efficiency map 115. By using the generated motor efficiency map 115, the motors can be controlled highly efficiently during subsequent running and the fuel consumption can be improved.

Although the first embodiment of the present invention is configured to generate the motor efficiency map 115 while the mobile body is caused to run, the predetermined motor efficiency map 115 may be prepared in advance and the data may be updated while the map is read during running.

A different mobile body may utilize the motor efficiency map 115 generated by another mobile body of the same vehicle type without change.

EXAMPLES

First Example

A first example of the present invention will hereinafter be described. In the first example, description will be made of an example of a case where the efficiency map generating apparatus is applied to a mobile body such as a vehicle equipped with in-wheel motors respectively incorporated and independently driven in four drive wheels. In this case, four motors M from M1 to M4 are used. The motors M can be three-phase alternate-current motors or DC motors. In the following examples, the same motors are used in four drive wheels. As described later, the number of the drive wheels is not limited to four and the present invention is applicable to cases of two, three, or five or more drive wheels.

(Configuration of vehicle)

Figure 3:
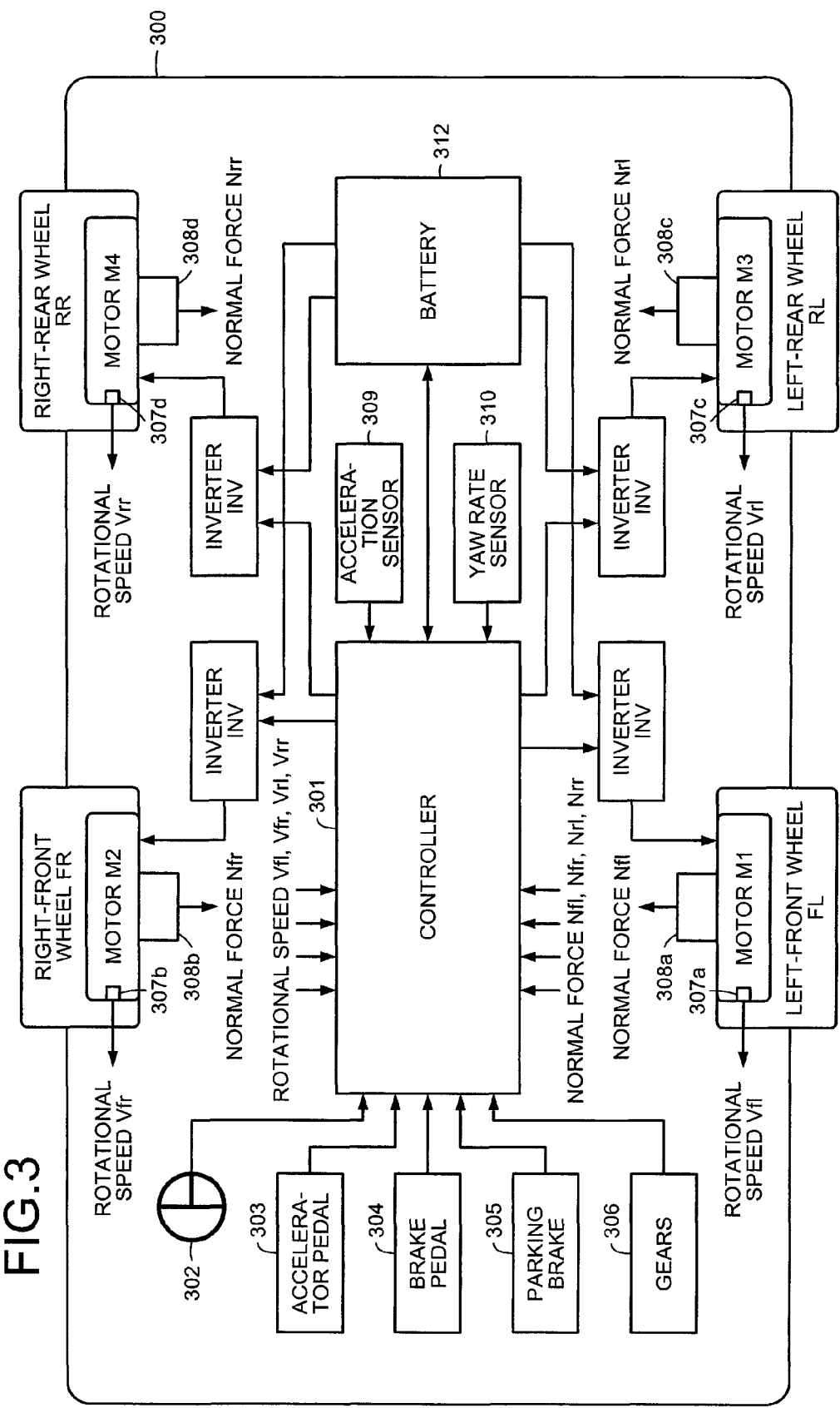
FIG. 3 is a diagram depicting a configuration of a vehicle.

FIG. 3 is a diagram depicting a configuration of the vehicle. A mobile body 300 is a 4-wheel drive vehicle having left and right front drive wheels FL, FR and left and right rear drive wheels RL, RR. These 4 drive wheels FL, FR, RL, RR are equipped with the in-wheel motors M1 to M4, respectively and are independently driven.

The motors M1 to M4 are each equipped with an inverter circuit INV for driving the motors. The inverters INV drive the motors M1 to M4, under the control of a controller (ECU) 301. The controller 301 receives input of various types of information and consequent to the distribution of torque, drives the motors M1 to M4.

Input to the controller 301 includes the following. The steering angle is input from a steering wheel 302. The instructed torque is input from an accelerator pedal 303.

The braking amount is input from a brake pedal 304. The parking brake amount is input from a parking brake 305. The gear position such as reverse, neutral and drive is input by gears 306.

Further, the drive wheels FL, FR, RL, RR are each equipped with a sensor 307a to 307d that detects a rotational speed V. The rotational speeds Vfl, Vfr, Vrl, and Vrr of the drive wheels FL, FR, RL, and RR are input to the controller 301. The drive wheels FL, FR, RL, and RR are each equipped with a sensor 308a to 308d that detects the normal force N subjected to the tires from the ground. The normal force Nfl, Nfr, Nrl, and Nrr of each of the drive wheels FL, FR, RL, and RR is input to the controller 301.

The mobile body 300 is equipped with an acceleration sensor 309 and the detected acceleration is input to the controller 301. The mobile body 300 is further equipped with a yaw rate sensor 310 and the detected yaw rate is input to the controller 301.

The controller 301 drives the drive wheels FL, FR, RL, RR, based on the above input. A control signal for driving, is supplied to the motors M1 to M4, via the inverter circuit INV, and suitably distributes torque to each of the drive wheels FL, FR, RL, and RR.

A battery 312 supplies power to the entire mobile body 300. In particular, the battery 312 is a drive source for driving the motors M1 to M4 of the drive wheels FL, FR, RL, RR, via the inverter circuit INV. A secondary cell such as a nickel metal hydride and a lithium ion secondary cell, or a fuel cell can be adopted as the battery 312.

During regeneration at the mobile body 300, the inverter circuit INV converts the alternating voltage generated by the motors M1 to M4 into direct voltage and can supply the resulting direct voltage to the battery 312. Regeneration is the generation of electric power when the driver of the mobile body 300 manipulates the brake pedal 304, and the generation of electric power by an easing of the force applied to the accelerator pedal 303 during travel.

(Hardware Configuration of Efficiency Map Generating Apparatus)

A hardware configuration of an efficiency map generating apparatus 400 will be described. FIG. 4 is a block diagram of a hardware configuration of the efficiency map generating apparatus. In FIG. 4, the efficiency map generating apparatus 400 includes a CPU 401, ROM 402, RAM 403, a communication I/F 415, a GPS unit 416, and various sensors 417, respectively connected by a bus 420.

The CPU 401 governs overall control of the efficiency map generating apparatus 400. The ROM 402 stores programs such as a boot program and the torque distribution program and can further store the motor efficiency maps. The RAM 403 is used as a work area of the CPU 401. In other words, the CPU 401 uses the RAM 403 as a work area and executes programs stored on the ROM 402 to thereby govern overall control of the efficiency map generating apparatus 400.

The communication I/F 415 is wirelessly connected to a network and functions as an interface of the efficiency map generating apparatus 400 and the CPU 401. Among communication networks functioning as the network are public line and mobile telephone networks, as well as dedicated short range communication (DSRC), LANs, and WANs. The communication I/F 415 is, for example, a module for connecting to public lines, an ETC unit, an FM tuner, a vehicle information and communication system (VICS)/beacon receiver and the like.

The GPS unit 416 receives signals from GPS satellites, and outputs information indicating the current position of the vehicle. Information output by the GPS unit 416 is used in conjunction with values output by the various sensors 417 described hereinafter when the current position of the vehicle is calculated by the CPU 401. Information indicating the current position is, for example, information that identifies 1 point on map data such as longitude/latitude, altitude, and the like.

If the motor efficiency map 115 is acquired from a server etc., outside the mobile body, the communication interface I/F 415 is used. The various sensors 417 are used for detecting vehicle body speed and normal force.

For example, the vehicle body speed is detected by the following methods:
1. integration of output of an accelerator sensor;
2. calculation from rotation speed of non-driving wheels; and
3. calculation from an optical position sensor.

To detect the normal force, load sensors respectively disposed on tires are used or the following methods are used for detection:
1. obtaining a deviation of the gravity center position from accelerator sensor output and calculating load balance between front and rear wheels;
2. obtaining a deviation of the gravity center position from angular speed sensor output and calculating load balance between right and left wheels; and
3. obtaining a deviation of the gravity center position from inclination sensor (gyro) output and calculating load balance between front and rear wheels and between right and left wheels.

The functions of the constituent elements of the torque distribution control unit 101 of the efficiency map generating apparatus 100 depicted in FIG. 1 are implemented by executing on the CPU 401, a predetermined program and controlling the units in the efficiency map generating apparatus 400 by using programs and data recorded in the ROM 402, the RAM 403, etc., in the efficiency map generating apparatus 400 described above.

A configuration related to acquisition of power consumption of a motor will be described. The information for detection of power consumption in the power consumption detecting unit 113 depicted in FIG. 1 can be detection outputs of an ammeter and a voltmeter as depicted.

Figure 5A:
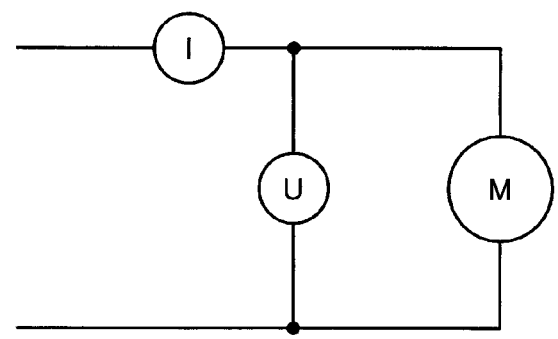
FIG. 5A is a diagram of a configuration related to acquisition of power consumption of a single-phase motor.

FIG. 5A is a diagram of a configuration related to acquisition of power consumption of a single-phase motor. The motor M is disposed with an ammeter I in series and a voltmeter U in parallel to detect instantaneous current I and instantaneous voltage U, respectively. The power consumption detecting unit 113 obtains power consumption P=the integral of (instantaneous current I×instantaneous voltage U).

Figure 5B:
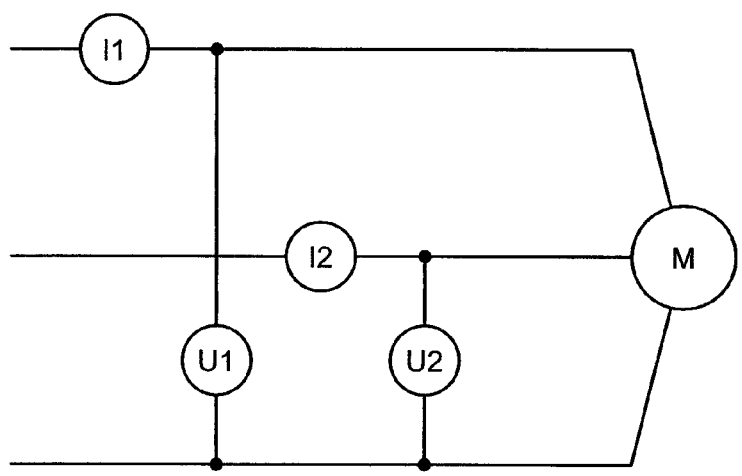
FIG. 5B is a diagram of a configuration related to acquisition of power consumption of a three-phase motor.

FIG. 5B is a diagram of a configuration related to acquisition of power consumption of a three-phase motor. The motor M is disposed with ammeters I1, I2 in series in two phases and voltmeters U1, U2 in parallel between two phases according to the two-wattmeter method to detect instantaneous currents I1, I2 and instantaneous voltages U1, U2, respectively. The power consumption detecting unit 113 obtains power consumption P=the integral of P1 (instantaneous current I1×instantaneous voltage U1)+the integral of P2 (instantaneous current I2×instantaneous voltage U2).

Figure 5C:
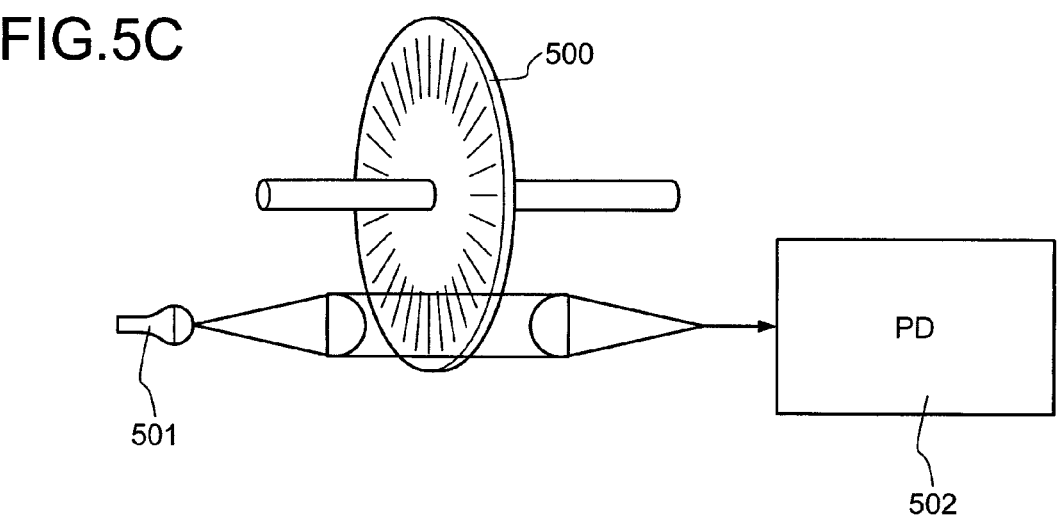
FIG. 5C is a diagram of a configuration related to acquisition of a motor rotation count.

FIG. 5C is a diagram of a configuration related to acquisition of the motor rotation count. The depicted configuration example is an optical pulse encoder having a slip plate 500 disposed on a rotation shaft of the motor M and light from a LED 501 is applied from one side of the slit plate 500 to receive the light of the LED 501, i.e., pulse light passing through the rotating slit plate 500, on the other side of the slit plate 500 by a light receiving element (PD) 502. The pulse light detected by the light receiving element 502 is output to the rotation count detection unit 103 depicted in FIG. 1 and the rotation count detection unit 103 detects the rotation count of the motor M based on the number of pulses per unit time.

The configuration of acquisition of the motor rotation count is not limited to the configuration depicted in FIG. 5C and various other methods are available such as using a magnetic pulse encoder, a resolver, etc.

(Overview of Motor Efficiency Map Generation)

Overview of motor efficiency map generation including a regenerative portion will be described. FIG. 6 is an explanatory view of a four-wheel-drive mobile body model. The model has an effective tire radius r=0.22 m, a maximum motor power running torque=100 Nm, a distance between the vehicle center axis and the front wheels (WF)=0.60 m, a distance from the vehicle center axis (WR)=0.40m, and a tread width front-to-back ratio ρ=WF/WR=1.5.

Assuming that the current wheel speed is V=40 km=11.11 m/s, the rotation count of the wheels is ω=V/r=50.505 rad/s. It is assumed that a drive force F=500 N is applied to the vehicle consequent to the instructed torque according to accelerator operation by the driver.

The sum of drive forces generated at the drive wheels coincides with the drive force F.

$$F1+F2+F3+F4=F$$

If the yaw moment around the gravity center applied to the vehicle is zero, then $$W1 \times F1 + W2 \times F2 + W3 \times F3 + W4 \times F4 = 0.$$

Converting into torque generated by the motors of the wheels, the following linear simultaneous equations with four unknowns are acquired.

$$T1+T2+T3+T4=r \times F \quad \text{(equation 1.1)}$$

$$W1 \times T1 + W2 \times T2 + W3 \times T3 + W4 \times T4 = 0 \quad \text{(equation 1.2)}$$

$$(W1-W4) \times T1 + (W2-W4) \times T2 + (W3-W4) \times T3 + r \times F \times W4 = 0$$

Figure 7:
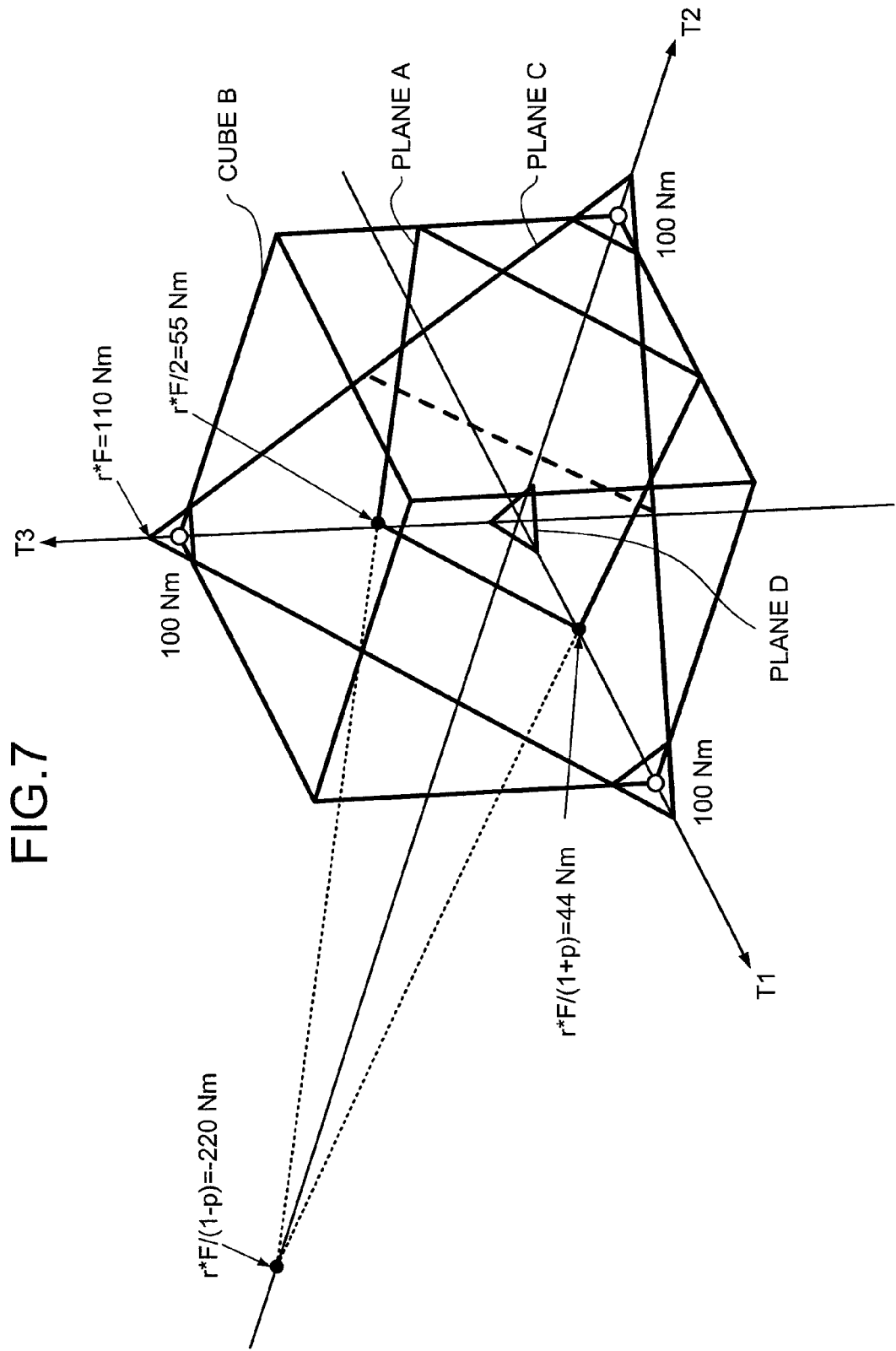
FIG. 7 is a diagram of a torque range cube B in an Euclidean space, a region E sandwiched by planes C and D, and a cut plane A.

FIG. 7 is a diagram of a torque range cube B in the Euclidean space, a region E sandwiched by planes C and D, and the cut plane A. The region E represents a region of possible torque values of a motor. T1, T2, and T3 are respective torque axes.

Here, W1=+WF, W=−WF, W3=+WR, W4=−WR is assumed.

$$(1+WF/WR) \times T1 + (1-WF/WR) \times T2 + 2 \times T3 = r \times F$$

$$(1+\rho) \times T1 + (1-\rho) \times T2 + 2 \times T3 = r \times F \quad \text{(plane A)}$$

Assuming that all the motors of the wheels have equivalent specifications, the possible torque ranges generated by the motors driving the wheels are expressed by the following simultaneous inequalities.

$$0<T1<100, 0<T2<100, 0<T3<100, 0<T4<100$$

$$0<T1<100, 0<T2<100, 0<T3<100 \quad \text{(cube B)}$$

$$T1+T2+T3=r \times F+70 \quad \text{(plane C)}$$

$$T1+T2+T3=r \times F-100 \quad \text{(plane D)}$$

The simultaneous inequalities represent the region E located inside the cube B and sandwiched by planes C and D. Therefore, the motors of the wheels can take a torque value of an arbitrary point (T1, T2, T3) on the cut plane of the region E' cut out by the plane A.

FIG. 8 is a diagram of discretization points on a torque T1-T2 plane and FIGS. 9A to 9D are diagrams of the motor efficiency map generation of the drive wheels. A region 801 represents a projection of the plane A onto the T1-T2 plane. A region 802 in the region 801 represents a projection of the region E onto the T1-T2 plane. Discretization is performed on the T1-T2 plane with ΔT=10 Nm. For example, in the case of T1=30 Nm as depicted in FIG. 9A, the points included in the region E are T2=0, 10, 20, 30, and 40 Nm (• of the figures) as depicted in FIG. 9B. In this case, the equation of the plane A and the equation (1.1) result in T3=17.5, 20, 22.5, 25, and 27.5 Nm as depicted in FIG. 9C and T4=62.5, 50, 37.5, 25, and 12.5 Nm as depicted in FIG. 9D.

Figure 10:
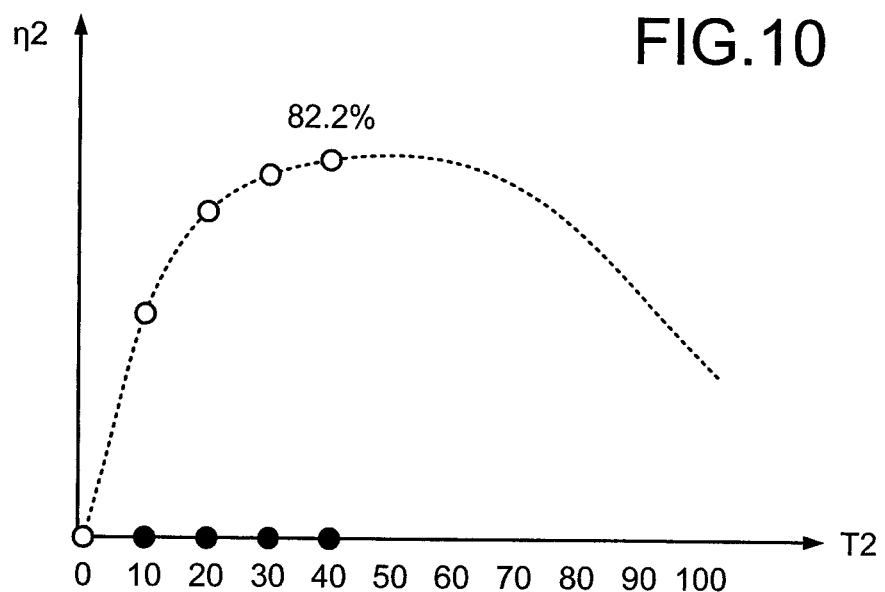
FIG. 10 is a diagram of torque dependency of motor power running efficiency.
Figure 14C:
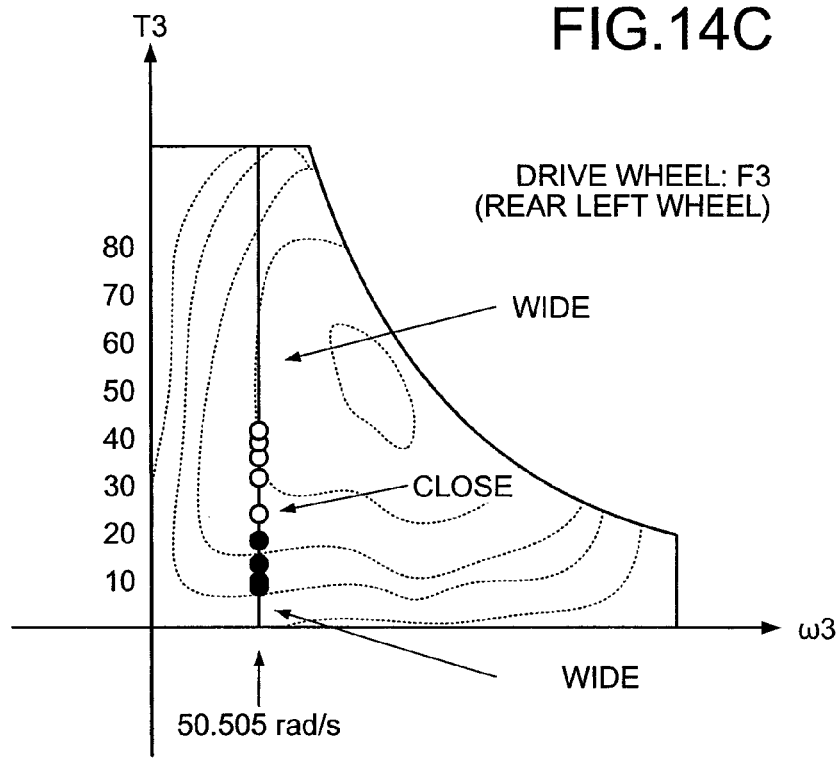
FIG. 14C is a diagram of the motor efficiency map generation of the drive wheels (part 3)
Figure 14D:
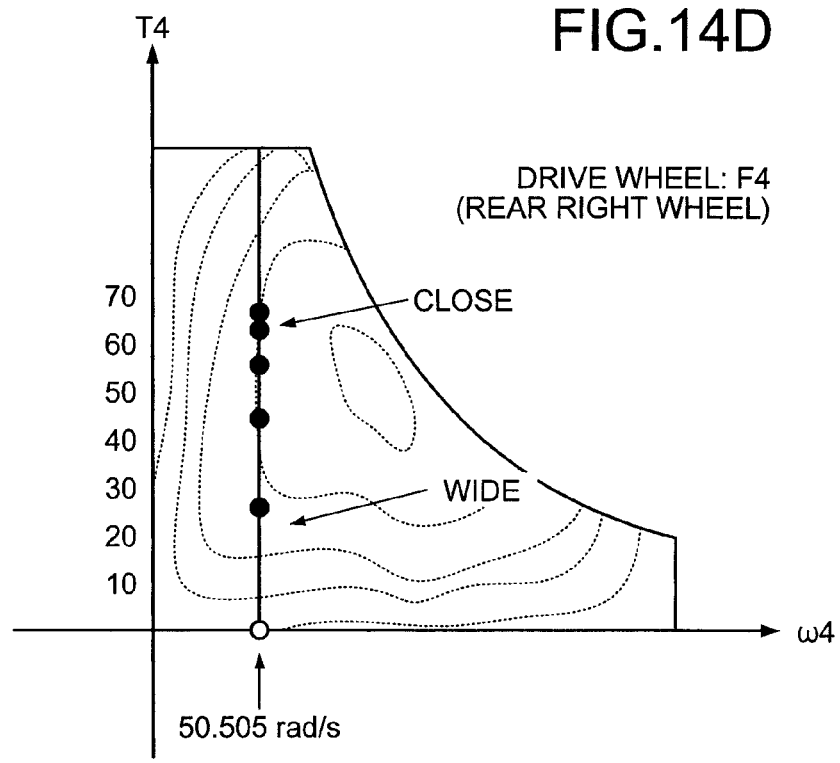
FIG. 14D is a diagram of the motor efficiency map generation of the drive wheels (part 4)

When the wheel speed is V=40 km/h, i.e., ω=50.505 rad/s, respective motor efficiencies are measured at the torque distribution points described above. For example, when the distribution is achieved at T1=30 Nm, T2=20 Nm, T3=22.5 Nm, and T4=37.5 Nm, instantaneous power consumptions P1, P2, P3, and P4 are measured from the currents and voltages of the motors. In this case, each motor has power running efficiency $\eta i = Ti \times (\omega/Pi)$. FIG. 10 is a diagram of torque dependency of motor power running efficiency. FIG. 10 depicts the torque dependency of power running efficiency θ2 of a motor 2 when T2 is changed from T2=0 to 40 Nm.

When the vehicle speed is changed by arbitrary discretization ΔV=10 km/h, the motor power running efficiency is measured with the same procedure, and the measurement can be repeated for each vehicle speed to construct the entire efficiency map. FIGS. 11A to 11D are diagrams of the motor efficiency map generation of the drive wheels.

If motors of the same type are used as the multiple motors M, the efficiency maps generated in FIGS. 11A to 11D are merged into one efficiency map, thereby enabling high-speed generation of the efficiency map. This is because the motor efficiency map is generated for each motor type rather than for each drive wheel.

(Efficiency Map Generation Process by Efficiency Map Generating Apparatus)

FIG. 12 is a flowchart of an efficiency map generation process according to the first example. The efficiency map generation process by the efficiency map generating apparatus 400 of this example will be described. The following process is executed and processed by the CPU 401 (the controller 301 of FIG. 3) of the efficiency map generating apparatus 400.

First, when a transition instruction for the efficiency map generation mode is given, the efficiency map generating apparatus 400 determines whether a transition to the efficiency map generation mode is allowed in the current situation (step S1201). For example, it is determined whether running at constant speed can be performed in the current state for a period until data necessary for the efficiency map generation is collected. In particular, map information and traffic congestion information are acquired to determine whether the subsequent running route is a straight road and enables running at constant speed for a predetermined period. If a transition to the efficiency map generation mode is allowed in the current situation (step S1201: YES), the process from step S1202 is executed and if a transition to the efficiency map generation mode is not allowed in the current situation (step S1201: NO), the mode transition is canceled and terminated.

If a generation process of efficiency map is started (step S1202), the drive force F[N] of the vehicle is calculated from the instructed torque according to the accelerator pedal operation (step S1203). The equation (1.1) and the plane equation A are determined based on the calculated drive force. The region E indicating the power running torque range is determined based on the drive force. The cut plane of the plane A included in the region E is calculated to calculate the projection region (step S1204).

The discretization is performed for the torque in the projection region with given criteria to determine the torque distribution of the motors from the plane equation A and the equation (1.1) (step S1205). A torque command value is applied to the inverter circuit INV of each motor according to the determined torque distribution (step S1206). The torque command value of each motor is determined in consideration of the effective tire radius. The current of each motor is measured at this point (step S1207).

The rotation count of each motor is measured (step S1208). The power is calculated from the torque and the rotation count of each motor (step S1209).

The voltage of each motor is measured concurrently with the operations at step S1208 (step S1210). The power consumption is calculated from the current and the voltage of each motor (step S1211).

The power running efficiency is then calculated from the power calculated at step S1209 and the power consumption calculated at step S1211 (step S1212). It is determined whether the torque and rotation count dependency data of the power running efficiency (FIG. 11A to 11D) are acquired (step S1213), and if not acquired (step S1213: NO), the process from step 51205 is repeated to collect the data with the torque distribution changed and if the torque and rotation count dependency data of the power running efficiency are acquired (step S1213: YES), the process is terminated.

As described above, according to the first example, the torque dependency of the motor efficiency at a given rotation count (vehicle speed during running) can be measured by changing the torque distribution of the motors under the condition of constant speed with the yaw moment around the gravity center set to zero while the mobile body is caused to run. By performing this measurement at each rotation count, the efficiency map of the mobile body can easily be generated in the mobile body itself.

Second Example

A second example is a configuration for more efficient generation of the efficiency map. As depicted in FIG. 10, the power running characteristics (efficiency curve) in the motor may change acutely or moderately relative to torque. Therefore, the interval of discretization is made wider in a portion with a moderate change and the interval of discretization is made closer in a portion with an acute change so as to change the interval of discretization depending on a change in the efficiency curve. In this case, a predetermined threshold value is used for determining whether a difference of efficiency in a pair of discretized adjacent motors is less than a predetermined level.

A four-wheel-drive mobile body model in the second example is assumed to be the same as FIG. 6. A relationship is also assumed to be the same in terms of the torque range cube B in the Euclidean space, the region E sandwiched by the planes C and D, and the cut plane A depicted in FIG. 7.

FIG. 13 is a diagram of discretization points on the torque T1-T2 plane according to the second example. A region 1301 represents a projection of the plane A onto the T1, T2 plane. A region 1302 in the region 1301 represents a projection of the region E onto the T1-T2 plane. Since the efficiency change on the efficiency map is acute in peripheral portions and moderated in a center portion, a difference in torque discretization is made closer in the peripheral portions and made wider in the center portion to enable efficient measurement.

For example, in the case of T1=30 Nm, the points included in the region E are T2=0, 4, 10, 18, and 30 Nm.

In this case, the equation of the plane A and the equation (1.1) result in T3=17.5, 18.5, 20, and 22.25 Nm and T4=62.5, 57.5, 50, 40, and 25 Nm.

FIGS. 14A to 14D are diagrams of the motor efficiency map generation of the drive wheels. These motor efficiency maps represent the points discretized with the closer and wider differences described above.

When the wheel speed is V=40 km/h, i.e., ω=50.505 rad/s, respective motor efficiencies are measured at the torque distribution points described above. For example, when the distribution is achieved at T1=30 Nm, T2=18 Nm, T3=22 Nm, and T4=40 Nm, the instantaneous power consumptions P1, P2, P3, and P4 are measured from the currents and voltages of the motors. In this case, each motor has power running efficiency $\eta i=Ti \times (\omega/Pi)$.

Figure 15:
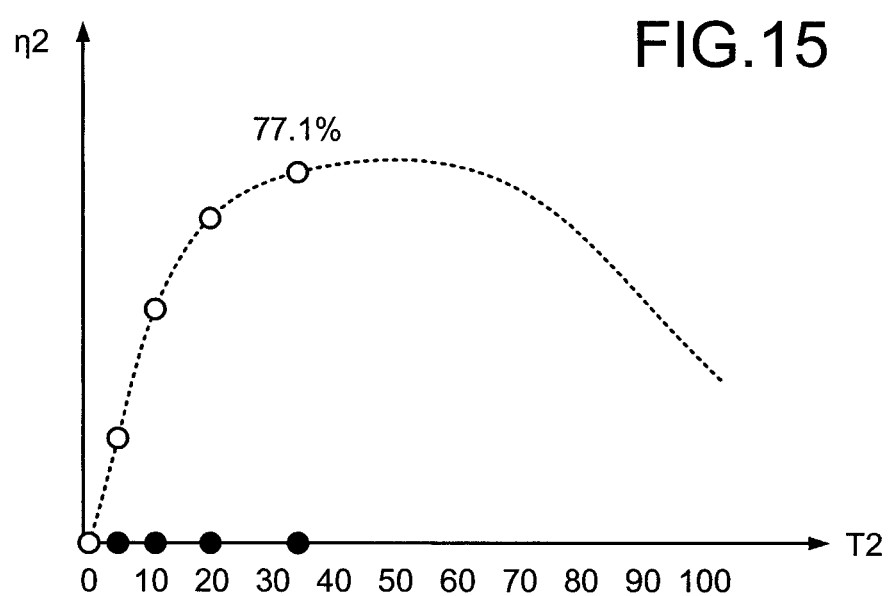
FIG. 15 is a diagram of torque dependency of motor power running efficiency.

FIG. 15 is a diagram of torque dependency of motor power running efficiency. FIG. 15 depicts the torque dependency of the power running efficiency η2 of the motor 2 when T2 is changed from T2=0 to 40 Nm. As depicted, by making the interval wider in a portion with a moderate change and making the interval closer in a portion with an acute change, the smooth efficiency map can be generated with necessary and sufficient discretization points.

When the vehicle speed is changed by arbitrary discretization ΔV=10 km/h, the motor power running efficiency is measured with the same procedure, and the measurement can be repeated for each vehicle speed to construct the entire efficiency map. FIGS. 16A to 16D are diagrams of the motor efficiency map generation of the drive wheels. If motors of the same type are used as the multiple motors M, the efficiency maps generated in FIGS. 16A to 16D are merged into one efficiency map, thereby enabling high-speed generation of the efficiency map.

(Efficiency Map Generation Process by Efficiency Map Generating Apparatus)

FIG. 17 is a flowchart of an efficiency map generation process according to the second example. The efficiency map generation process by the efficiency map generating apparatus 400 of this example will be described. The following process is executed and processed by the CPU 401 (the controller 301 of FIG. 3) of the efficiency map generating apparatus 400.

First, when a transition instruction for the efficiency map generation mode is given, the efficiency map generating apparatus 400 determines whether a transition to the efficiency map generation mode is allowed in the current situation (step S1701). For example, it is determined whether running at constant speed can be performed in the current state for a period until data necessary for the efficiency map generation is collected. In particular, map information and traffic congestion information are acquired to determine whether the subsequent running route is a straight road and enables running at constant speed for a predetermined period. If a transition to the efficiency map generation mode is allowed in the current situation (step S1701: YES), the process from step S1702 is executed and if a transition to the efficiency map generation mode is not allowed in the current situation (step S1701: NO), the mode transition is canceled and terminated.

If a generation process of efficiency map is started (step S1702), the drive force F[N] of the vehicle is calculated from the instructed torque according to the accelerator pedal operation (step S1703). The equation (1.1) and the plane equation A are determined based on the calculated drive force. The region E indicating the power running torque range is determined based on the drive force. The cut plane of the plane A included in the region E is calculated to calculate the projection region (step S1704).

The discretization is performed for the torque in the projection region with given criteria to determine the torque distribution of the motors from the plane equation A and the equation (1.1) (step S1705). In this case, the discretization is performed in a closer manner under the condition of larger efficiency change and in a wider manner under the condition of smaller efficiency change for the torque in the projection region. A torque command value is applied to the inverter circuit INV of each motor according to the determined torque distribution (step S1706). The torque command value of each motor is determined in consideration of the effective tire radius. The current of each motor is measured at this point (step S1707).

The rotation count of each motor is measured (step S1708). The power is calculated from the torque and the rotation count of each motor (step S1709). The voltage of each motor is measured concurrently with the operations at step S1708 (step S1710). The power consumption is calculated from the current and the voltage of each motor (step S1711).

The power running efficiency is then calculated from the power calculated at step S1709 and the power consumption calculated at step S1711 (step S1712). It is determined whether the torque and rotation count dependency data of the power running efficiency (FIGS. 16A to 16D) are acquired (step S1713), and if not acquired (step S1713: NO), the process from step S1705 is repeated to collect the data with the torque distribution changed and if the torque and rotation count dependency data of the power running efficiency are acquired (step S1713: YES), the process is terminated.

As described above, according to the second example, the torque dependency of the motor efficiency at a given rotation count (vehicle speed during running) can be measured by changing the torque distribution of the motors under the condition of constant speed with the yaw moment around the gravity center set to zero while the mobile body is caused to run. By performing this measurement at each rotation count, the efficiency map of the mobile body can easily be generated in the mobile body itself. Since the second example is configured such that the interval of discretization is altered depending on a change in the power running efficiency curve relative to the motor torque, the number of measurement points necessary and sufficient for generating the efficiency map can efficiently be acquired and the efficiency map can efficiently and quickly be generated.

(Second Embodiment)

A second embodiment of the present invention will be described. The second embodiment relates to generation of high torque region of the motor efficiency map. To acquire data of the high torque region, the second embodiment is configured such that driving by drive wheels is performed while braking is applied by regeneration wheels. As a result, torque equal to or greater than the instructed torque according to the accelerator pedal operation can be applied to the drive wheels and therefore, the data of the high torque region can be acquired.

The configuration of the efficiency map generating apparatus in the second embodiment is the same as the first embodiment except that the torque distributing unit 112 depicted in FIG. 1 provides control of causing any of multiple motors to generate regenerative torque.

Figure 18:
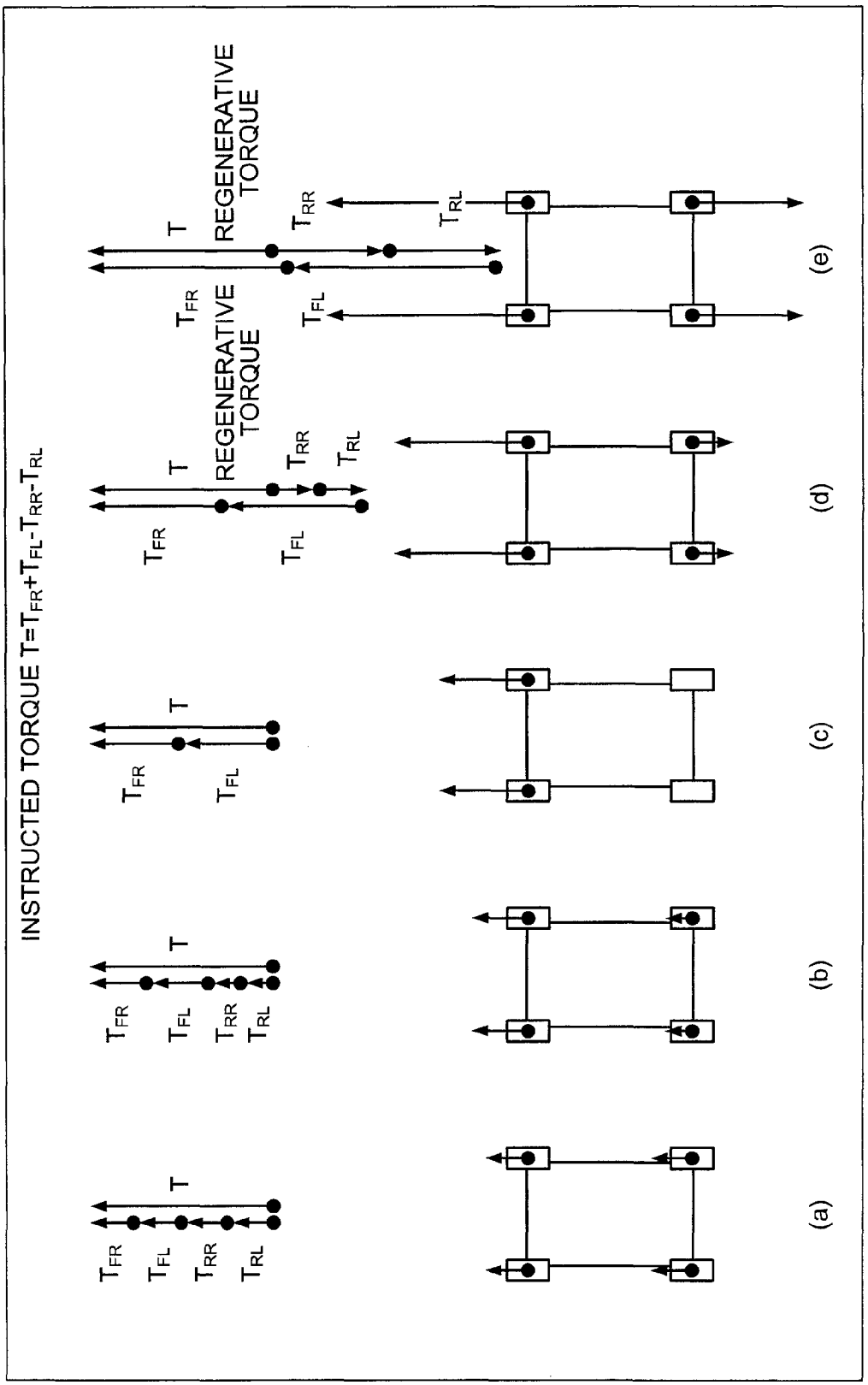
FIG. 18 is a diagram of regenerative torque distribution according to a second embodiment of the present invention.

FIG. 18 is a diagram of regenerative torque distribution according to the second embodiment of the present invention. An instructed torque T is distributed to the drive wheels (a) to (c). The torque of the left and right wheels is set to the same value for postural stability. When the regenerative torque is generated, torque is distributed to satisfy $T=T_{FR}+T_{FL}-T_{RR}-T_{RL}$ (d), (e). The regenerative torque has a direction opposite to the power running torque.

Figure 19A:
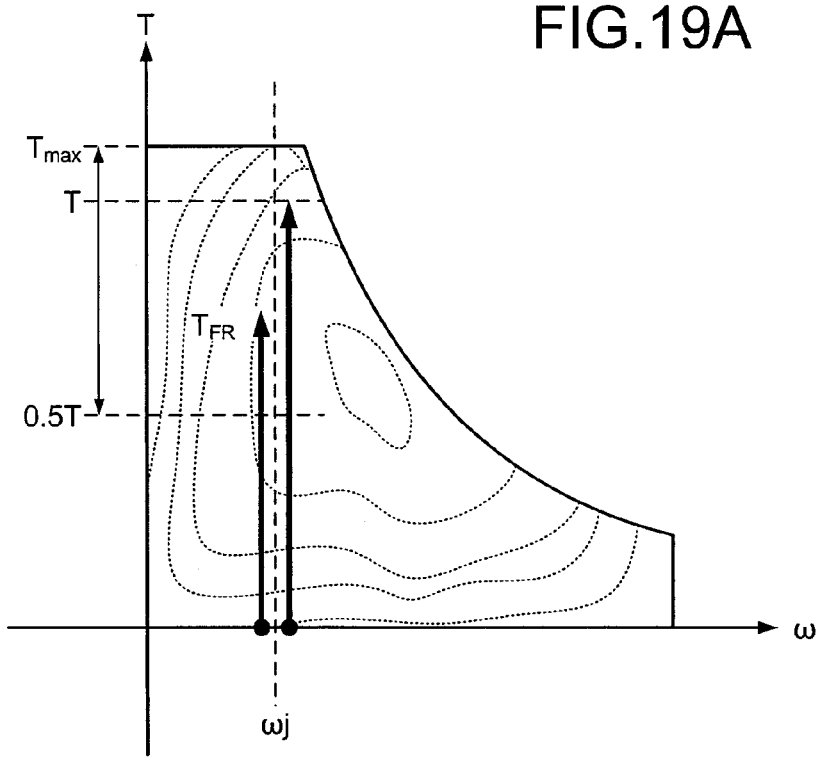
FIG. 19A is a diagram of a torque range on a motor efficiency map when regenerative torque is generated.

FIG. 19A is a diagram of a torque range on a motor efficiency map when the regenerative torque is generated. When the mobile body is caused to run at speed ω and the instructed torque T with the regenerative torque, the front-wheel or rear-wheel torque can be changed within a range of 0.5T<Tx<Tmax (within the range of the regenerative torque) while the instructed torque T is kept constant.

Figure 19B:
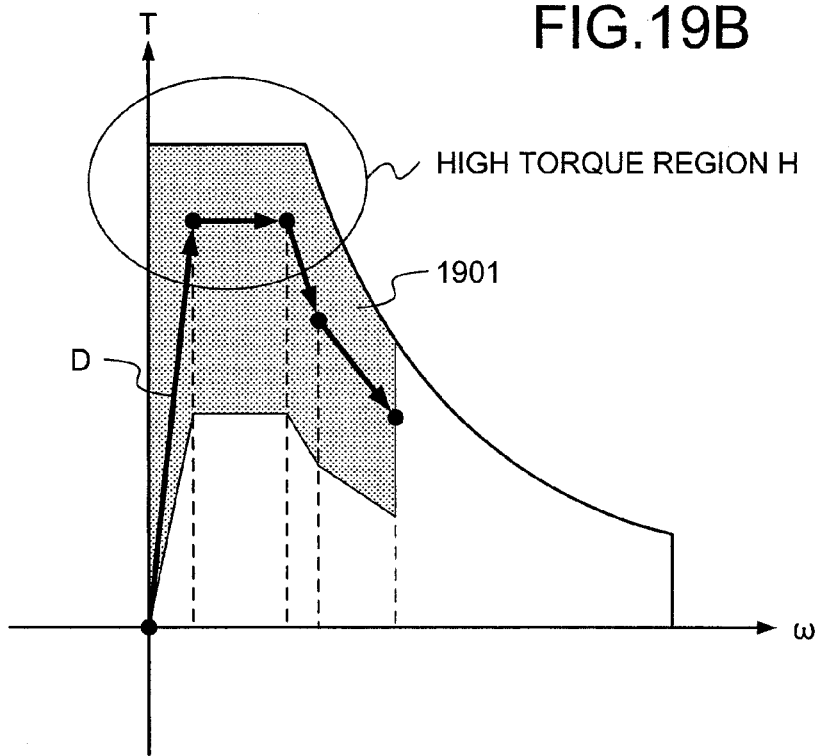
FIG. 19B is a diagram of acquisition of a high torque region of a motor efficiency map.

FIG. 19B is a diagram of acquisition of a high torque region of the motor efficiency map. According to the above description, as depicted in FIG. 19B, when torque is changed along a given running pattern D, data 1901 necessary for the efficiency map from ½ of the maximum torque to the maximum torque can be acquired. Particularly, data of a high torque region H can be acquired that cannot be acquired in normal running.

(Overview of Motor Efficiency Map Generation Including Regenerative Portion)

Overview of motor efficiency map generation including a regenerative portion will be described. FIG. 20 is an explanatory view of a four-wheel-drive mobile body model. The model has an effective tire radius r=0.22 m, a maximum motor power running torque=100 Nm, a maximum motor regenerative torque=70 Nm, a distance between the vehicle center axis and the front wheels (WF)=0.60 m, a distance between the vehicle center axis and the rear wheels (WR)=0.40m, and a tread width front-to-back ratio ρ=WF/WR=1.5.

Assuming that the current wheel speed is V=40 km=11.11 m/s, the rotation count of the wheels is ω=V/r=50.505 rad/s. It is assumed that a drive force F=500 N is applied to the vehicle consequent to the instructed torque according to accelerator operation by the driver.

The sum of drive forces generated at the drive wheels coincides with the drive force F.

$$F1+F2+F3+F4=F$$

If the yaw moment around the gravity center applied to the vehicle is zero, then $$W1 \times F1+W2 \times F2+W3 \times F3+W4 \times F4=0.$$

Converting into torque generated by the motors of the wheels, the following linear simultaneous equations with four unknowns are acquired.

$$T1+T2+T3+T4=r \times F \qquad \text{(equation 1.1)}$$

$$W1 \times T1+W2 \times T2+W3 \times T3+W4 \times T4=0 \qquad \text{(equation 1.2)}$$

$$(W1-W4) \times T1+(W2-W4) \times T2+(W3-W4) \times T3+r \times F \times W4=0$$

FIG. 21 is a diagram of a torque range cube B' in the Euclidean space, a region E' sandwiched by planes C' and D', and the cut plane A. The region E' represents a region of possible torque values of a motor. T1, T2, and T3 are respective torque axes.

Here, W1=+WF, W2=−WF, W3=+WR, W4=−WR is assumed.

$$(1+WF/WR) \times T1 + (1-WF/WR) \times T2 + 2 \times T3 = r \times F$$

$$(1+\rho) \times T1 + (1-\rho) \times T2 + 2 \times T3 = r \times F \quad \text{(plane A)}$$

Assuming that all the motors of the wheels have equivalent specifications, the possible torque ranges generated by the motors driving the wheels are expressed by the following simultaneous inequalities.

$$-70 < T1 < 100, -70 < T2 < 100, -70 < T3 < 100,$$
$$-70 < T4 < 100$$

$$-70 < T1 < 100, -70 < T2 < 100, -70 < T3 < 100 \quad \text{(cube B')}$$

$$T1 + T2 + T3 = r \times F + 70 \quad \text{(plane C')}$$

$$T1 + T2 + T3 = r \times F - 100 \quad \text{(plane D')}$$

The simultaneous inequalities represent the region E' located inside the cube B' and sandwiched by planes C' and D'. Therefore, the motors of the wheels can take a torque value of an arbitrary point (T1, T2, T3) on the cut plane of the region E' cut out by the plane A.

Figure 23A:
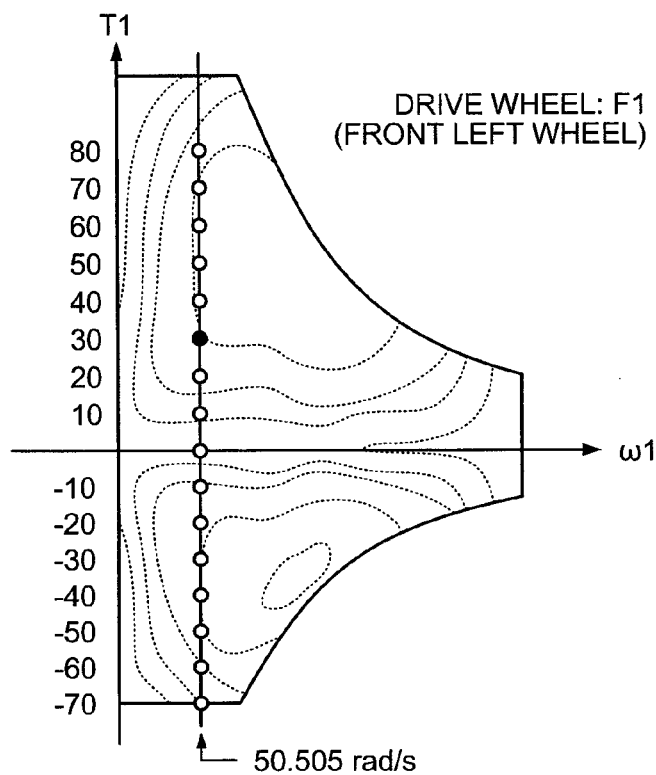
FIG. 23A is a diagram of the motor efficiency map generation of the drive wheels (part 1)
Figure 23B:
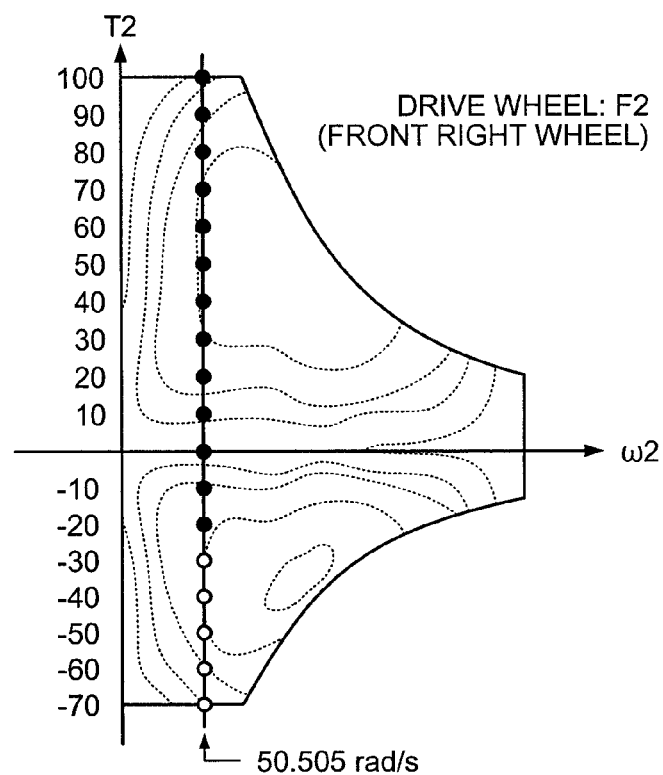
FIG. 23B is a diagram of the motor efficiency map generation of the drive wheels (part 2)
Figure 23C:
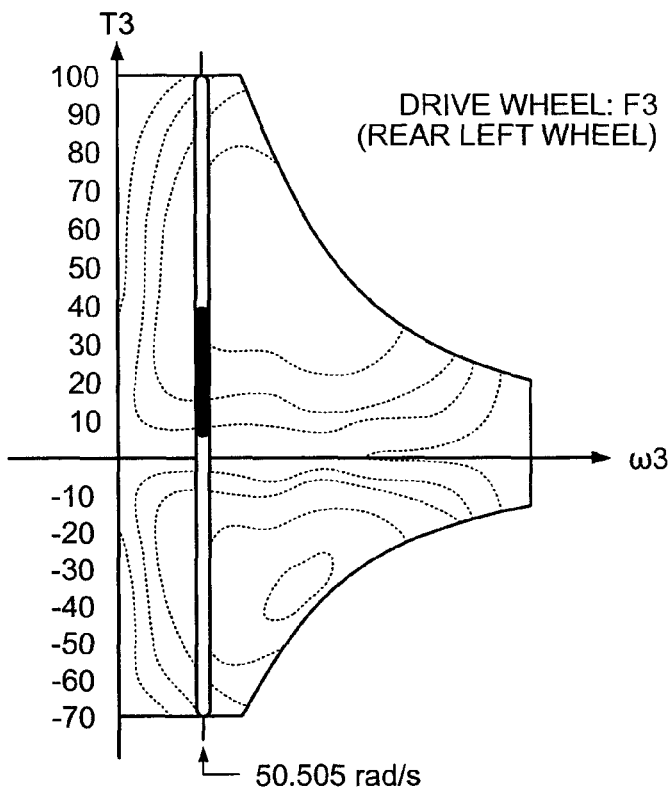
FIG. 23C is a diagram of the motor efficiency map generation of the drive wheels (part 3)
Figure 23D:
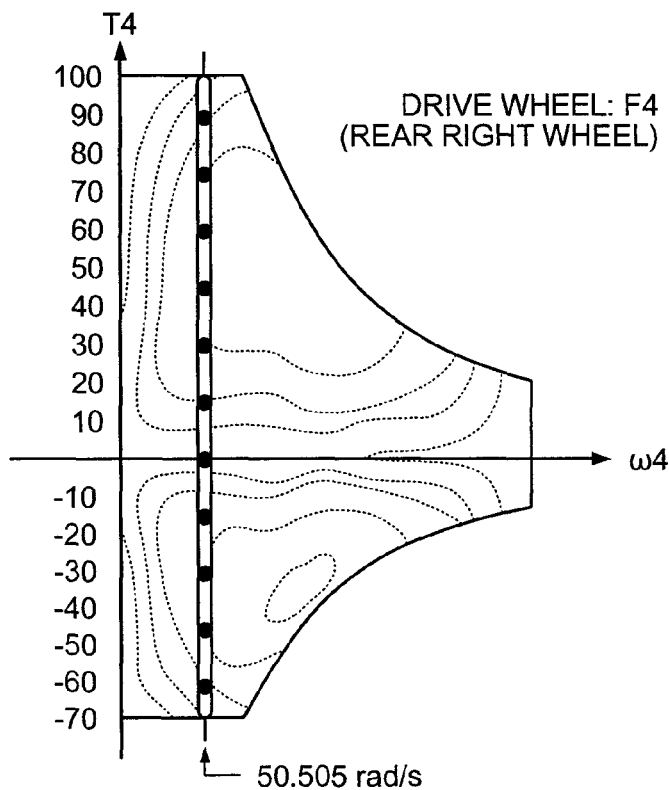
FIG. 23D is a diagram of the motor efficiency map generation of the drive wheels (part 4)
Figure 25A:
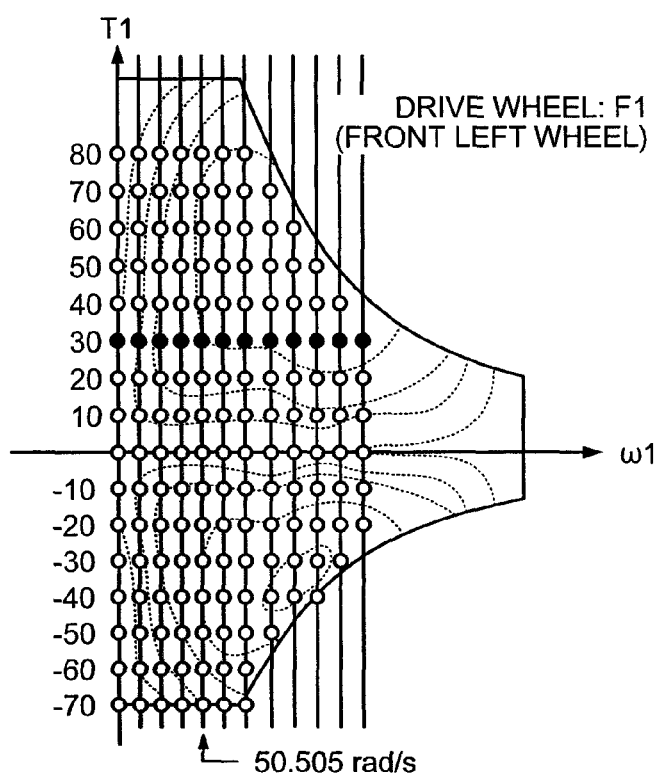
FIG. 25A is a diagram of the motor efficiency map generation of the drive wheels (part 1)
Figure 25B:
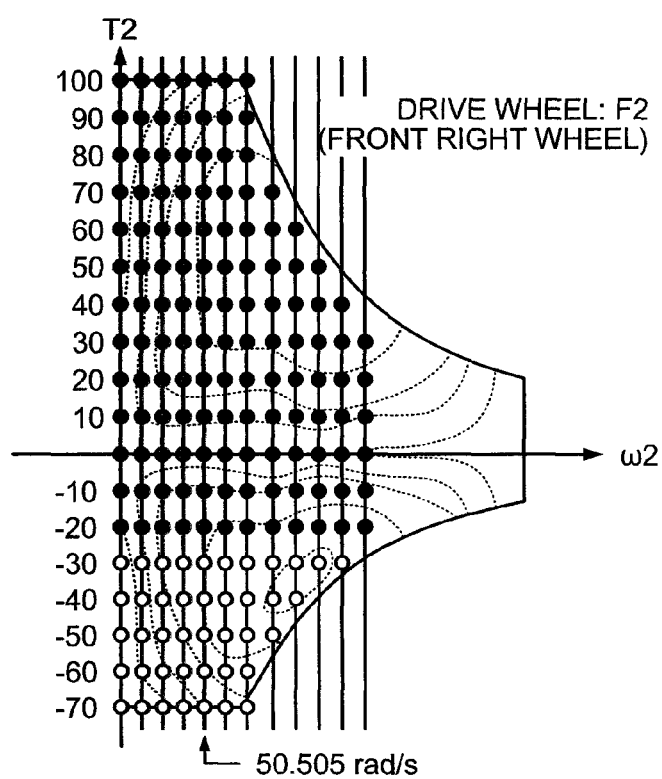
FIG. 25B is a diagram of the motor efficiency map generation of the drive wheels (part 2)
Figure 25C:
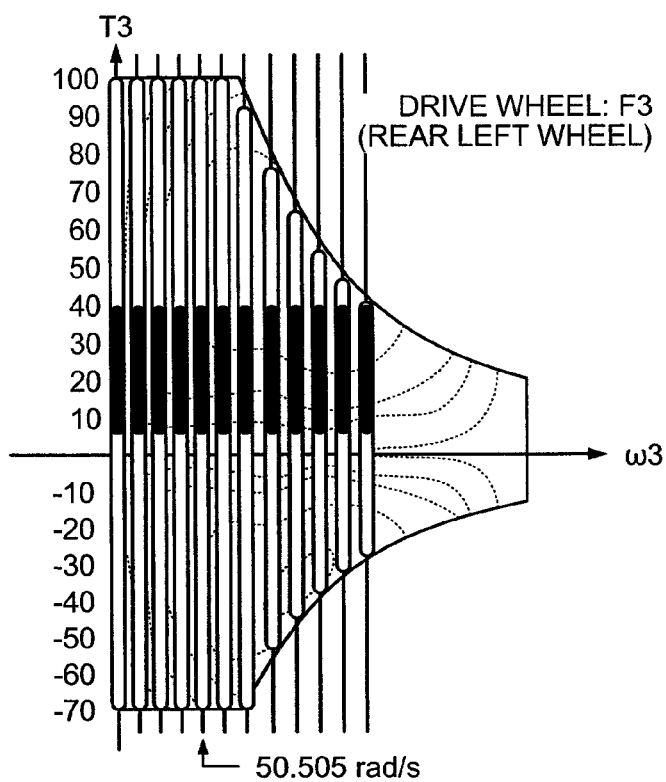
FIG. 25C is a diagram of the motor efficiency map generation of the drive wheels (part 3)
Figure 25D:
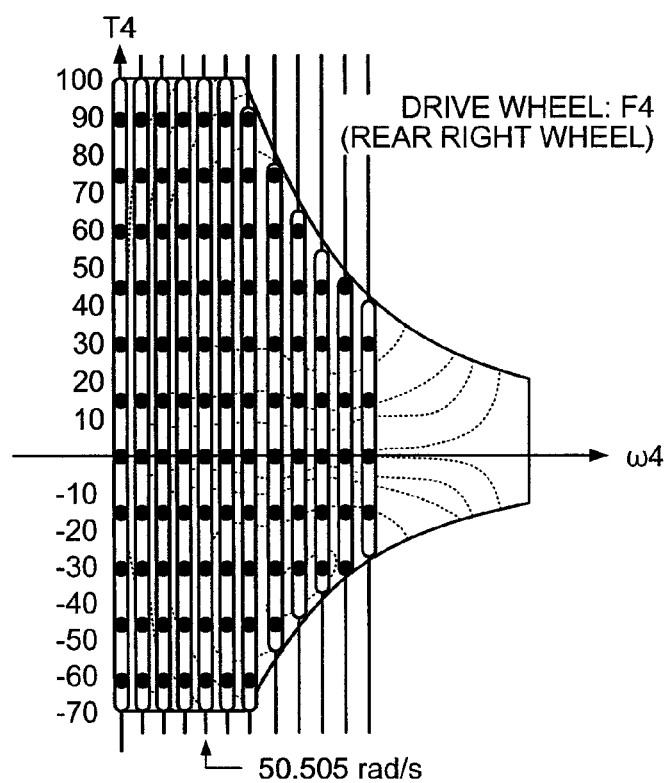
FIG. 25D is a diagram of the motor efficiency map generation of the drive wheels (part 4)

FIG. 22 is a diagram of discretization points on the torque T1-T2 plane and FIGS. 23A to 23D are diagrams of the motor efficiency map generation of the drive wheels. A region 2201 represents a projection of the plane A onto the T1, T2 plane. A region 2202 represents a projection of the region E' onto the T1-T2 plane. Discretization is performed on the T1-T2 plane with $\Delta T=10$ Nm. For example, in the case of T1=30 Nm as depicted in FIG. 23A, the points included in the region E' are T2=−20, −10, 0, 10, 20, . . . , 100 Nm (• of the figures) as depicted in FIG. 23B. In this case, the equation of the plane A and the equation (1.1) result in T3=12.5, 15, . . . , 42.5 Nm as depicted in FIG. 23C and T4=87.5, 75, . . . , −62.5 Nm as depicted in FIG. 23D.

As depicted, the regenerative portion can be generated in the negative torque axis direction. With the method described above, the torque distribution including the regenerative portion can be achieved under the condition of constant drive force without generation of the yaw moment.

When the wheel speed is V=40 km/h, i.e., $\omega$=50.505 rad/s, respective motor efficiencies are measured at the torque distribution points described above. For example, when the distribution is achieved at T1=30 Nm, T2=−20 Nm, T3=12.5 Nm, and T4=87.5 Nm, instantaneous power consumptions and regenerative electric powers P1, P2, P3, and P4 are measured from the currents and voltages of the motors. In this case, each motor has power running efficiency (and regenerative efficiency) $\eta i = abs(Ti) \times (\omega/Pi)$.

FIG. 24 is a diagram of torque dependency of motor power running/regenerative efficiency. FIG. 24 depicts the torque dependency of the power running efficiency $\eta 2$ of the motor 2 when T2 is changed from T2=−30 to 100 Nm.

When the vehicle speed is changed by arbitrary discretization $\Delta V=10$ km/h, the motor power running efficiency and regenerative efficiency are measured by the same procedure, and the measurement can be repeated for each vehicle speed to construct the entire efficiency map. FIGS. 25A to 25D are diagrams of the motor efficiency map generation of the drive wheels. As depicted, the torque data of the regenerative efficiency is generated on the negative torque axis. If motors of the same type are used as the multiple motors M, the efficiency maps generated in FIGS. 25A to 25D are merged into one efficiency map, thereby enabling high-speed generation of the efficiency map.

(Efficiency Map Generation process Including Regenerative Torque)

FIG. 26 is a flowchart of an efficiency map generation process according to the second embodiment. First, when a transition instruction for the efficiency map generation mode is given, the efficiency map generating apparatus 400 determines whether transition to the efficiency map generation mode is allowed in the current situation (step S2601). For example, it is determined whether running at constant speed can be performed in the current state for a period until data necessary for the efficiency map generation is collected. In particular, map information and traffic congestion information are acquired to determine whether the subsequent running route is a straight road and enables running at constant speed for a predetermined period. If a transition to the efficiency map generation mode is allowed in the current situation (step S2601: YES), the process from step S2602 is executed and if a transition to the efficiency map generation mode is not allowed in the current situation (step S2601: NO), the mode transition is canceled and terminated.

If a generation process of efficiency map is started (step S2602), the drive force F[N] of the vehicle is calculated from the instructed torque according to the accelerator pedal operation (step S2603). The equation (1.1) and the plane equation A are determined based on the calculated drive force. The region E indicating the power running torque range and the regenerative torque range is determined based on the drive force. The cut plane of the plane A included in the region E is calculated to calculate the projection region (step S2604).

The discretization is performed for the torque in the projection region with given criteria to determine the torque distribution of the motors from the plane equation A and the equation (1.1) (step S2605). A torque command value is applied to the inverter circuit INV of each motor according to the determined torque distribution (step S2606). The torque command value of each motor is determined in consideration of the effective tire radius. The current of each motor is measured at this point (step S2607).

The rotation count of each motor is measured (step S2608). The power is calculated from the torque and the rotation count of each motor (step S2609).

The voltage of each motor is measured concurrently with the operations at step S2608 (step S2610). The power consumption is calculated form the current and the voltage of each motor (step S2611). The regenerative electric power is calculated at this point for the motors corresponding to the regenerative portion.

The power running efficiency and the regenerative efficiency are then calculated from the power calculated at step S2609 and the power consumption and the regenerative electric power calculated at step S2611 (step S2612). It is determined whether the torque and rotation count dependency data of the power running efficiency and the regenerative efficiency (FIG. 25A to 25D) are acquired (step S2613). If not acquired (step S2613: NO), the process from step S2605 is repeated to collect the data with the torque distribution changed and if the torque and rotation count dependency data of the power running efficiency and the regenerative efficiency are acquired (step S2613: YES), the process is terminated.

As described above, according to the second embodiment, the torque dependency of the motor power running efficiency and the regenerative efficiency at a given rotation count (vehicle speed during running) can be measured by changing the torque distribution of the motors while providing the regenerative control of at least one of the motors under the condition of constant speed with the yaw moment around the gravity center set to zero while the mobile body is caused to run. By performing this measurement at each rotation count, the regenerative efficiency map can be easily generated in addition to the power running efficiency map of the mobile body in the mobile body itself. Additionally, since the second embodiment is configured such that driving by drive wheels is performed while braking is applied by regeneration wheels to acquire data of the high torque region, a torque equal to or greater than the instructed torque according to the accelerator pedal operation can be applied to the drive wheels and therefore, the data of the high torque region can be acquired.

Figure 27:
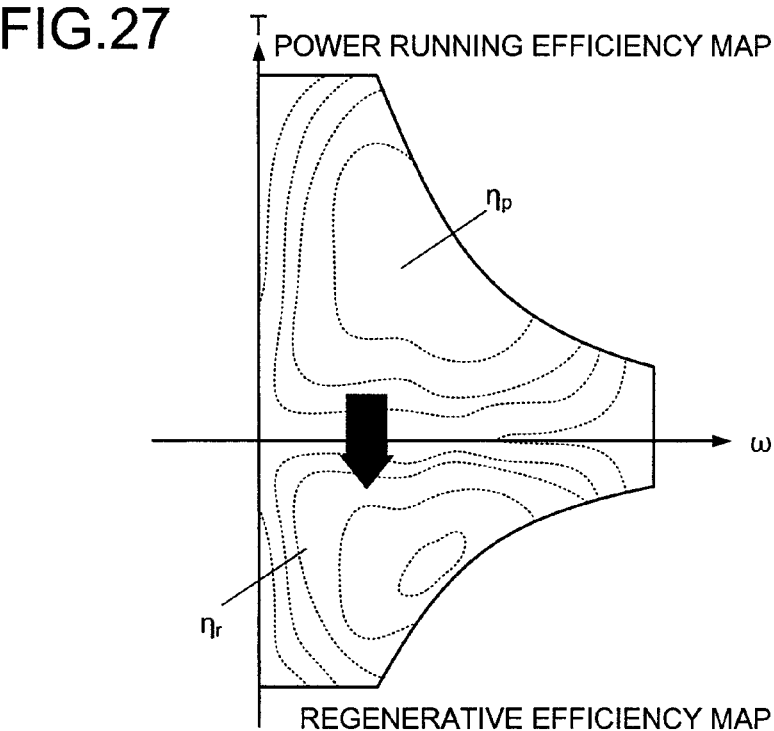
FIG. 27 is a diagram of another technique of the regenerative efficiency map generation.

A variation of the second embodiment will be described. A configuration of using the generated power running efficiency map as an initial value for generating the regenerative efficiency map will be described. FIG. 27 is a diagram of another technique of the regenerative efficiency map generation. As depicted, the characteristic shape of the regenerative efficiency map is used as an initial value on the assumption that the shape is the same as the power running efficiency map. Specifically, a converting unit defines a power running efficiency map ηp inverted around a rotation axis co in the negative torque axis direction as an initial value of a regenerative efficiency map ηr.

Figure 28:
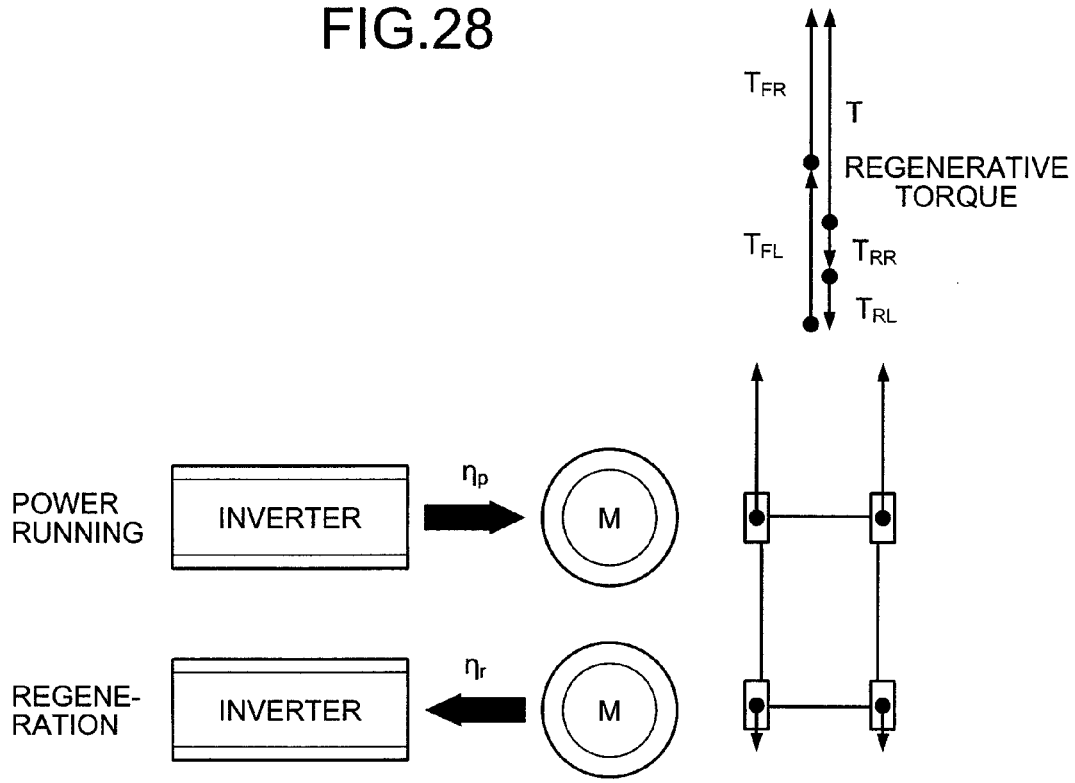
FIG. 28 is a diagram for explaining correlation between power running efficiency and regenerative efficiency.

FIG. 28 is a diagram for explaining correlation between power running efficiency and regenerative efficiency. During the power running, the motors are driven via the inverter circuits INV to apply the motor torque T. In this case, the front wheels are driven to generate motor torques $T_{FR}$ and $T_{FL}$ at the front wheels. By causing the motors of the rear wheels to perform regeneration at this point, opposite torques $T_{RR}$ and $T_{RL}$ are generated and a regenerative current is generated from the motors to the inverters. The motor regenerative efficiency is efficiency of conversion from mechanical energy to electric energy.

Therefore, in the regenerative efficiency map generating method, 1. the regenerative efficiency is measured concurrently with the efficiency map generation through regenerative torque distribution;
2. since the power running efficiency map and the regenerative efficiency map ideally have equivalent torque characteristics, the power running efficiency map is inverted and used as an initial value of the regenerative efficiency map;
3. the regenerative efficiency map acquired at 2. is updated in a range that can be measured at 1; and
4. during normal running, the regenerative efficiency map is updated each time regenerative braking is utilized.

As described above, according to the second embodiment, the power running efficiency map and the regenerative efficiency map can be respectively generated as the motor efficiency map while the mobile body is caused to run. Particularly, the characteristics of the high torque portion of the power running efficiency map can be acquired by causing at least one of the motors to perform regenerative braking during running so that the power running efficiency map including the high torque portion can be generated. Although it is difficult to acquire data of the high torque portion because of a lower running frequency even if the mobile body is caused to run, the utilization of the regenerative braking of at least one of the motors enables the acquisition of data of the high torque portion for the other power-running motors during running even without high-speed running.

In the embodiments, the efficiency map is the efficiency map including the inverter circuits INV (the inverter circuits 120) to which the motors M are connected. In other words, as depicted in FIG. 1, if voltage and current are detected upstream from the inverter circuit 102, the efficiency map including the inverter circuits INV is generated. This is not a limitation and, if voltage and current are detected downstream from the inverter circuits INV (the inverter circuits 120), the efficiency map of the motors M can be generated without including the inverter circuits INV.

The efficiency map generating method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

EXPLANATIONS OF LETTERS OR NUMERALS

100, 400 efficiency map generating apparatus
101 torque distribution control unit
102 inverter circuits
103 rotation count detection units
104 voltage detecting unit
105 current detecting unit
111 instructed torque detecting unit
112 torque distributing unit
113 power consumption detecting unit
114 efficiency map generating unit
115 motor efficiency map
300 mobile body
301 controller
307a to 307d (rotational speed) sensors
308a to 308d (normal force) sensors
309 acceleration sensor
310 yaw rate sensor
312 battery
FL, FR, RL, RR drive wheels
M (M1 to M4) motors
INV inverter circuit

The invention claimed is:

1. An efficiency map generating apparatus that during an efficiency map generating mode, generates an efficiency map of a plurality of motors connected to drive wheels of a mobile body while the mobile body is moving at a constant speed, the efficiency map generating apparatus comprising: a power consumption detecting unit including an ammeter and a voltmeter, and detecting power consumption of the motors; a rotation count detecting unit that detects rotation counts of the motors; and a processor; configured to: detect, by the processor, an instructed torque input for the motors, based on a manipulation amount of an accelerator pedal of the mobile body; distribute the instructed torque in a plurality of combinations to each of the motors, based on the instructed torque by selecting at least one or all of a plurality of drive wheels connected to the motor; change the torque distribution of the motors, by the processor; cause, by the processor, any of the motors to generate predetermined regenerative torque and thereby, adds to the motors that are not caused to generate the regenerative torque, a torque value that is a distribution of the instructed torque, to distribute the regenerative torque; generate, by the processor, the efficiency map based on the plurality of combinations of torque, the power consumption, and the rotation counts; and reiteratively perform, by the processor, processing to generate the efficiency map for each speed among a plurality of speeds of the mobile body.

2. The efficiency map generating apparatus according to claim 1, wherein the efficiency map is a power running efficiency map.

3. The efficiency map generating apparatus according to claim 1, further configured to
  distribute, by the processor, torque when the mobile body is caused to run under a condition that the instructed torque is constant with zero yaw moment around a gravity center of the mobile body, and
  generate, by the processor, the efficiency map under the condition.

4. The efficiency map generating apparatus according to claim 2, further configured to cause, by the processor, predetermined motors among the motors to generate the regenerative torque.

5. The efficiency map generating apparatus according to claim 1, wherein the efficiency map is an efficiency map that includes inverters connected to the motors.

6. The efficiency map generating apparatus according to claim 1, further configured to generate, by the processor, a power running efficiency map of the motors and further includes a converting unit that converts the power running efficiency map into a regenerative efficiency map.

7. The efficiency map generating apparatus according to claim 1, wherein
  the motors are of a same type, and further configured to integrate, by the processor, into one efficiency map, efficiency maps generated respectively for the motors.

8. An efficiency map generating method of an efficiency map generating apparatus that during an efficiency map generating mode, generates an efficiency map of a plurality of motors connected to drive wheels of a mobile body while the mobile body is moving at a constant speed, the efficiency map generating method comprising: detecting an instructed torque input for the motors, based on a manipulation amount of an accelerator pedal of the mobile body; distributing the instructed torque in a plurality of combinations to each of the motors, based on the instructed torque by selecting at least one or all of a plurality of drive wheels connected to the motor, changing the torque distribution of the motors, by a processor; detecting power consumption of the motors; detecting rotation counts of the motors; generating the efficiency map based on the plurality of combinations of torque, the power consumption, and the rotation counts; and processing to generate the efficiency map for each speed among a plurality of speeds of the mobile body, wherein the distributing includes causing any of the motors to generate regenerative torque and thereby, adding to the motors that are not caused to generate the regenerative torque, a torque value that is a distribution of the instructed torque, to distribute the regenerative torque.

9. A non-transitory computer-readable recording medium storing a program causing a compute to execute the efficiency map generating method according to claim 8.

10. The efficiency map generating apparatus according to claim 1, wherein a rotation count of the wheels is related to wheel speed by $\omega=V/r$ where $\omega$ is the rotation count, V is the wheel speed and r is the wheel radius.

* * * * *